(12) United States Patent
Pan et al.

(10) Patent No.: US 12,382,031 B2
(45) Date of Patent: Aug. 5, 2025

(54) FILTERING METHOD AND APPARATUS, AND DEVICE

(71) Applicant: HANGZHOU HIKVISION DIGITAL TECHNOLOGY CO., LTD., Zhejiang (CN)

(72) Inventors: Dongping Pan, Zhejiang (CN); Yucheng Sun, Zhejiang (CN); Fangdong Chen, Zhejiang (CN); Li Wang, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 265 days.

(21) Appl. No.: 18/173,776

(22) Filed: Feb. 23, 2023

(65) Prior Publication Data
US 2023/0209051 A1    Jun. 29, 2023

Related U.S. Application Data

(63) Continuation of application No. PCT/CN2021/114311, filed on Aug. 24, 2021.

(30) Foreign Application Priority Data

Aug. 24, 2020 (CN) .......................... 202010859387.1

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/119* (2014.11); *H04N 19/167* (2014.11); *H04N 19/182* (2014.11)

(58) Field of Classification Search
CPC ....... H05K 5/03; H01M 10/63; H04N 19/117; H04N 19/105; H04N 19/119;
(Continued)

(56) References Cited

U.S. PATENT DOCUMENTS 8,195,001 B2   6/2012   Chiu et al.
8,620,103 B2  12/2013   Chiu et al.
(Continued)

FOREIGN PATENT DOCUMENTS

CN    104639948    5/2015
CN    104683819    6/2015
(Continued)

OTHER PUBLICATIONS

Japanese Patent Office, Office Action Issued in Application No. 2023-513515, Jul. 29, 2024 (Submitted with Partial Translation).
(Continued)

*Primary Examiner* — Christopher S Kelley
*Assistant Examiner* — Asmamaw G Tarko
(74) *Attorney, Agent, or Firm* — Ladas & Parry, LLP

(57) ABSTRACT

A filtering method and apparatus, and a device are provided. The filtering method includes: when it is determined to enable Wiener filtering for an adaptive leveling filter unit of a current picture, deriving the adaptive leveling filter unit from a current Largest Coding Unit (LCU) of the current picture; obtaining reference pixels of the adaptive leveling filter unit and filter coefficients of a Wiener filter; and according to the reference pixels and the filter coefficients of the Wiener filter, performing the Wiener filtering based on sample pixels of the adaptive leveling filter unit; where the Wiener filter is a centrosymmetric filter with a shape of a 7*7 cross plus a 5*5 square, and values of the reference pixels are derived from pixel values of a reconstructed picture before the Wiener filtering.

16 Claims, 11 Drawing Sheets

(51) Int. Cl.
*H04N 19/119* (2014.01)
*H04N 19/167* (2014.01)
*H04N 19/182* (2014.01)

(58) Field of Classification Search
CPC .... H04N 19/167; H04N 19/182; H04N 19/14; H04N 19/174; H04N 19/176; H04N 19/46; H04N 19/463; H04N 19/70; H04N 19/80; H04N 19/82; H04N 19/86
USPC .................................................. 375/240.02
See application file for complete search history.

(56) References Cited

U.S. PATENT DOCUMENTS

| | | | |
|---|---|---|---|
| 9,247,253 B2 | 1/2016 | Chiu et al. | |
| 9,485,521 B2* | 11/2016 | Lim | H04N 19/86 |
| 9,948,954 B2* | 4/2018 | Lim | H04N 19/82 |
| 10,123,048 B2* | 11/2018 | Chen | H04N 19/70 |
| 10,165,273 B2 | 12/2018 | Chiu et al. | |
| 10,171,808 B2 | 1/2019 | Chiu et al. | |
| 10,425,660 B2* | 9/2019 | Lim | H04N 19/86 |
| 10,609,417 B2* | 3/2020 | Chao | H04N 19/439 |
| 11,051,041 B2* | 6/2021 | Lim | H04N 19/61 |
| 11,570,474 B2* | 1/2023 | Lim | H04N 19/82 |
| 11,917,204 B2* | 2/2024 | Lim | H04N 19/82 |
| 2002/0186890 A1* | 12/2002 | Lee | H04N 19/80 375/E7.193 |
| 2009/0257670 A1 | 10/2009 | Chiu et al. | |
| 2012/0177104 A1* | 7/2012 | Budagavi | H04N 19/117 375/E7.176 |
| 2012/0189064 A1* | 7/2012 | Kossentini | H04N 19/117 375/E7.193 |
| 2012/0219059 A1 | 8/2012 | Chiu et al. | |
| 2012/0321205 A1* | 12/2012 | Lai | H04N 19/176 382/233 |
| 2013/0034159 A1* | 2/2013 | Siekmann | H04N 19/61 375/240.12 |
| 2013/0113880 A1* | 5/2013 | Zhao | H04N 19/82 348/43 |
| 2013/0272624 A1* | 10/2013 | Budagavi | H04N 19/86 382/239 |
| 2014/0098866 A1 | 4/2014 | Chiu et al. | |
| 2014/0146891 A1 | 5/2014 | Chuang et al. | |
| 2014/0355695 A1* | 12/2014 | Lim | H04N 19/13 375/240.29 |
| 2016/0088296 A1 | 3/2016 | Chiu et al. | |
| 2016/0212424 A1 | 7/2016 | Chiu et al. | |
| 2017/0310986 A1 | 10/2017 | Lin et al. | |
| 2018/0270508 A1* | 9/2018 | Lim | H04N 19/132 |
| 2018/0324420 A1* | 11/2018 | Wang | H04N 19/103 |
| 2019/0052911 A1* | 2/2019 | Zhang | H04N 19/136 |
| 2019/0306502 A1* | 10/2019 | Gadde | H04N 19/117 |
| 2019/0373258 A1* | 12/2019 | Karczewicz | H04N 19/174 |
| 2020/0021822 A1* | 1/2020 | An | G06T 5/20 |
| 2020/0204800 A1* | 6/2020 | Hu | H04N 19/82 |
| 2020/0304785 A1* | 9/2020 | Hu | G06F 7/22 |
| 2020/0314424 A1* | 10/2020 | Hu | H04N 19/463 |
| 2020/0404263 A1* | 12/2020 | Hu | H04N 19/86 |
| 2021/0014537 A1* | 1/2021 | Hu | H04N 19/174 |
| 2021/0195183 A1* | 6/2021 | Hu | H04N 19/176 |
| 2021/0218962 A1* | 7/2021 | Lim | H04N 19/1883 |
| 2022/0248006 A1* | 8/2022 | Lim | H04N 19/70 |
| 2022/0408085 A1* | 12/2022 | Lim | H04N 19/176 |
| 2023/0179764 A1* | 6/2023 | Shlyakhov | H04N 19/117 |

FOREIGN PATENT DOCUMENTS

| | | |
|---|---|---|
| CN | 104702963 | 6/2015 |
| CN | 105306957 | 2/2016 |
| CN | 105306975 | 2/2016 |
| CN | 105357538 | 2/2016 |
| CN | 106878729 | 6/2017 |
| JP | 2014506061 A | 3/2014 |
| WO | 2018170801 | 9/2018 |

OTHER PUBLICATIONS

"Information Technology Intelligent Media Coding Part 2: Video", T/AI 109.2-2020, May 13, 2020, p. 1-8, 20, 43, 44, 187-191. (Submitted with Partial Translation).

"IEEE Standard for Second-Generation IEEE 1857 Video Coding", IEEE Std 1857.4- 2018, IEEE Computer Society, Aug. 30, 2019, 15 pages.

"Benjamin Bross, et al., ""Versatile Video Coding (Draft 8)""", Document: JVET-Q2001-vE, Joint Video Experts Team (JVET) of ITU-T SG16 WP 3 and ISO/IEC JTC 1/SC 29/WG 11, JVET-Q2001 (version 15), Mar. 12, 2020, 24 Pages."

International Search Report for PCT/CN2021/114311 mailed on Nov. 12, 2021 and its English translation provided by WIPO.

Written Opinion of the International Searching Authority for PCT/CN2021/114311 mailed on Nov. 12, 2021 and its English translation provided by Google Translate.

Chinese Office Action and Search Report for Application No. 2020108593871, issued on Oct. 18, 2022, with English translation provided by applicant's foreign counsel.

Chinese Office Action and Search Report for Application No. 2021111463030, issued on Aug. 17, 2022, with English translation provided by applicant's foreign counsel.

Songyi Li et al."CUDA Acceleration for AVS2 Loop Filtering," 2016 IEEE Second International Conference on Multimedia Big Data, Aug. 18, 2016, all pages.

* cited by examiner

|     |     | C0  |     |     |     |
|-----|-----|-----|-----|-----|-----|
| C1  | C2  | C3  | C4  | C5  |     |
| C6  | C7  | C8  | C9  | C10 |     |

| C11 | C12 | C13 | C14 | C13 | C12 | C11 |
|-----|-----|-----|-----|-----|-----|-----|

|     | C10 | C9  | C8  | C7  | C6  |
|-----|-----|-----|-----|-----|-----|
|     | C5  | C4  | C3  | C2  | C1  |
|     |     | C0  |     |     |     |

FIG. 7

|     |     | P0  |     |     |     |
|-----|-----|-----|-----|-----|-----|
| P1  | P2  | P3  | P4  | P5  |     |
| P6  | P7  | P8  | P9  | P10 |     |

| P11 | P12 | P13 | P14 | P15 | P16 | P17 |
|-----|-----|-----|-----|-----|-----|-----|

|     | P18 | P19 | P20 | P21 | P22 |
|-----|-----|-----|-----|-----|-----|
|     | P23 | P24 | P25 | P26 | P27 |
|     |     | P28 |     |     |     |

FIG. 8

FILTERING METHOD AND APPARATUS, AND DEVICE

CROSS REFERENCE TO RELATED APPLICATIONS

This application is a continuation application of International Application No. PCT/CN2021/114311 filed on Aug. 24, 2021, which claims priority to a Chinese Patent Application No. 202010859387.1 filed on Aug. 24, 2020, the entire contents of which are incorporated herein by reference.

TECHNICAL FIELD

The present disclosure relates to video encoding and decoding technology, in particular to a filtering method, a filtering apparatus and devices.

BACKGROUND

Complete video encoding generally includes operations such as prediction, transformation, quantization, entropy coding, and filtering.

There is quantization operation after block-based motion compensation, which produces coding noise and causes video quality distortion. Loop post-processing technology is used to reduce the influence of such distortion. Loop post-processing technology includes Deblocking Filter (DBF), Sample Adaptive Offset (SAO) and Adaptive Leveling Filter (ALF).

ALF technology used in Audio Video coding Standard (AVS) coding framework calculates optimal linear filtering of an original signal and a distorted signal in a mean square sense based on the principle of Wiener filtering.

However, it is found in practice that the ALF technology, based on the principle of Wiener filtering, trains a small amount of filter coefficients at an encoding end, and transmits such filter coefficients to a decoding end to filter a reconstructed picture sequence, so as to improve image quality. Due to a large number of pixels of a picture, but a few filter coefficients, a model established by the ALF technology will have an under-fitting condition when processing most pictures.

SUMMARY

In view of this, the present disclosure provides a filtering method, a filtering apparatus and devices.

Specifically, the present disclosure is realized through the following technical solutions.

According to a first aspect of embodiments of the present disclosure, there is provided a filtering method, which is applied to an encoding device or a decoding device. The method includes:
when it is determined to enable Wiener filtering for an adaptive leveling filter unit of a current picture,
deriving the adaptive leveling filter unit from a current Largest Coding Unit (LCU) of the current picture;
obtaining reference pixels of the adaptive leveling filter unit and filter coefficients of a Wiener filter; and
according to the reference pixels and the filter coefficients of the Wiener filter, performing the Wiener filtering based on sample pixels of the adaptive leveling filter unit;
where the Wiener filter is a centrosymmetric filter with a shape of a 7*7 cross plus a 5*5 square, and values of the reference pixels are derived from pixel values of a reconstructed picture before the Wiener filtering.

According to a second aspect of the embodiments of the present disclosure, there is provided a filtering apparatus, which is applied to an encoding device or a decoding device, the apparatus includes a determining unit and a filtering unit, where
the filtering unit is configured to, when the determining unit determines to enable Wiener filtering for an adaptive leveling filter unit of a current picture, derive the adaptive leveling filter unit from a current Largest Coding Unit (LCU) of the current picture, obtain reference pixels of the adaptive leveling filter unit and filter coefficients of a Wiener filter, and according to the reference pixels and the filter coefficients of the Wiener filter, perform the Wiener filtering based on sample pixels of the adaptive leveling filter unit;
where the Wiener filter is a centrosymmetric filter with a shape of a 7*7 cross plus a 5*5 square, and values of the reference pixels are derived from pixel values of a reconstructed picture before the Wiener filtering.

According to a third aspect of the embodiments of the present disclosure, there is provided a decoding device, including a processor and a machine-readable storage medium storing machine executable instructions that can be executed by the processor, where when executing the machine executable instructions, the processor is caused to:
when it is determined to enable Wiener filtering for an adaptive leveling filter unit of a current picture,
derive the adaptive leveling filter unit from a current Largest Coding Unit (LCU) of the current picture;
obtain reference pixels of the adaptive leveling filter unit and filter coefficients of a Wiener filter; and
according to the reference pixels and the filter coefficients of the Wiener filter, perform the Wiener filtering based on sample pixels of the adaptive leveling filter unit;
where the Wiener filter is a centrosymmetric filter with a shape of a 7*7 cross plus a 5*5 square, and values of the reference pixels are derived from pixel values of a reconstructed picture before the Wiener filtering.

According to a fourth aspect of the embodiments of the present disclosure, there is provided an encoding device, including a processor, and a machine-readable storage medium storing machine executable instructions that can be executed by the processor, where the processor is configured to execute the machine executable instructions to implement the filtering method provided in the first aspect.

According to a fifth aspect of the embodiments of the present disclosure, there is provided a decoding device, including a processor, and a machine-readable storage medium storing machine executable instructions that can be executed by the processor, where the processor is configured to execute the machine executable instructions to implement the filtering method provided in the first aspect.

According to a sixth aspect of the embodiments of the present disclosure, there is provided a non-transient machine-readable storage medium having stored thereon machine-readable instructions that, when executed by a processor, implement the filtering method in the first aspect.

In the filtering method of the embodiment of the present disclosure, a second Wiener filter is obtained by shape amplification on the basis of the first Wiener filter which is a centrosymmetric filter with a window shape of a 7*7 cross plus a 3*3 square. When it is determined to enable Wiener filtering for a current LCU of a current picture, reference pixels of the current LCU and filter coefficients of the second Wiener filter are obtained, and the Wiener filtering is performed on pixels of the current LCU one by one according to the reference pixels of the current LCU and the filter coefficients of the second Wiener filter, so as to optimize the filtering effect and improve the encoding and decoding performance.

BRIEF DESCRIPTION OF THE DRAWINGS

FIG. 7 is a schematic diagram illustrating a second Wiener filter according to an exemplary embodiment of the present disclosure;

FIG. 8 is a schematic diagram illustrating reference pixel positions according to an exemplary embodiment of the present disclosure;

DETAILED DESCRIPTION OF THE EMBODIMENTS

Figure 1:
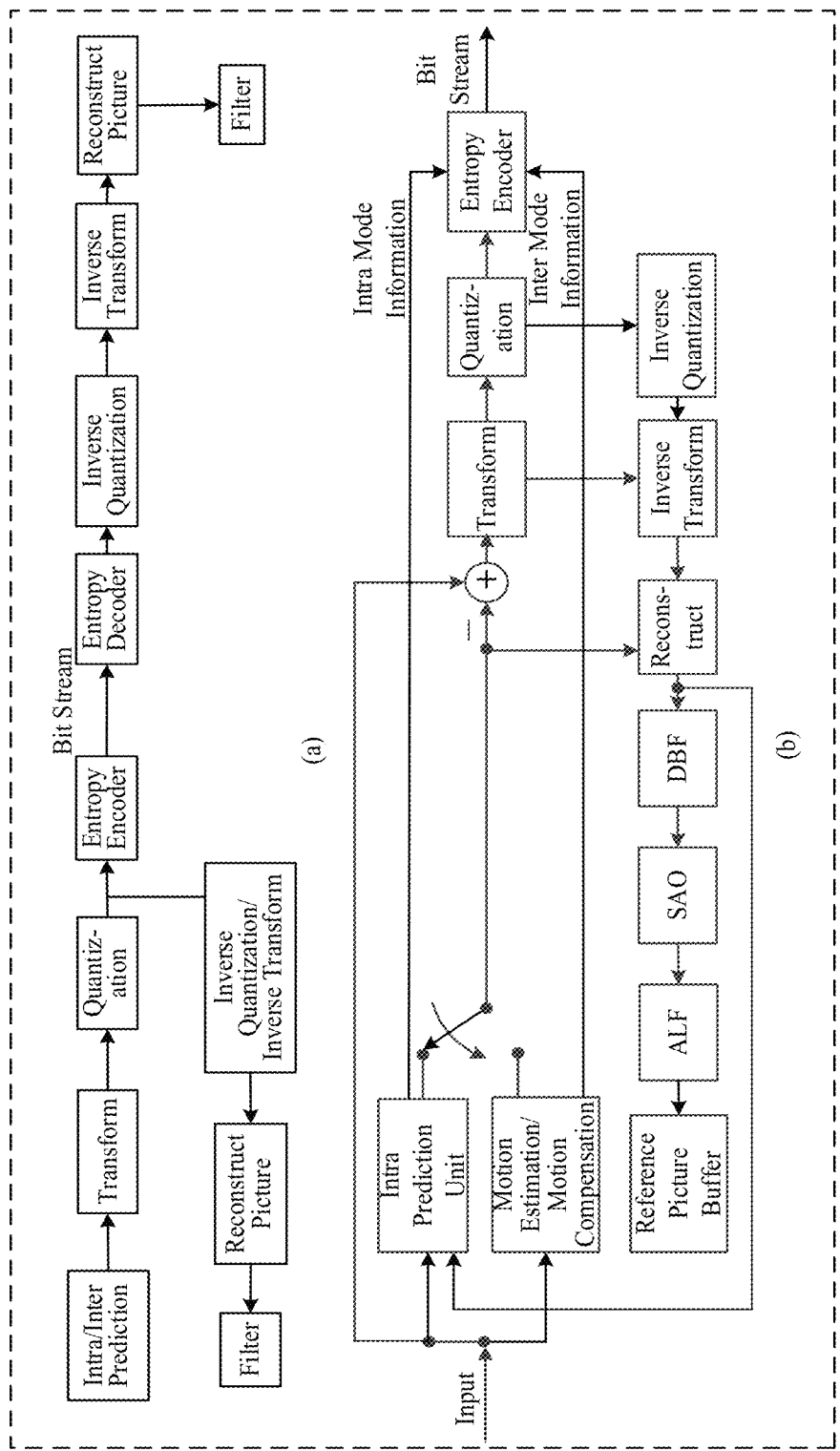
FIG. 1 is a schematic flow diagram illustrating video encoding and decoding.

Exemplary embodiments will be described in detail herein, examples of which are shown in accompanying drawings. When the following description refers to the drawings, unless otherwise indicated, same number in different drawings indicates same or similar elements. Implementations described in the following exemplary embodiments do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms "a", "the" and "said" in the singular form used in the present disclosure and the appended claims are also intended to include plurality, unless otherwise clearly indicated in the context.

In order to enable those skilled in the art to better understand the technical solutions according to the embodiments of the present disclosure, the technical terms involved in the embodiments of the present disclosure, the main flow of existing video encoding and decoding, and the implementation of Wiener filtering technology (ALF technology) will be briefly described below.

I. Technical Terms

1. Rate-Distortion Optimized (RDO): Indicators for evaluating coding efficiency include bit rate and Peak Signal to Noise Ratio (PSNR). The smaller a bit rate is, the greater the compression rate is; the larger the PSNR is, the better the quality of a reconstructed picture is. A discriminant formula used when performing mode selection is essentially a comprehensive evaluation of the two indicators.

The cost corresponding to a mode can be calculated according to the following formula: $J(mode)=D+\lambda*R$, where D represents a distortion, usually may be measured by a Sum of Squared Errors (SSE), and SSE refers to a sum of squared differences between a reconstructed block and a source picture block; $\lambda$ represents a Lagrangian multiplier; R represents an actual number of bits required for encoding a picture block in this mode, including a total number of bits required for encoding mode information, motion information, and residuals, etc.

When selecting a mode, if the RDO principle is used to make a comparison decision on encoding modes, a better coding performance can usually be guaranteed.

2. Coding Tree Unit (CTU): Traditional video coding is based on macroblocks. For a video with a 4:2:0 sampling format, a macroblock contains one luma block with a 16×16 size and two chroma blocks with a 8×8 size. Considering characteristics of high-definition video/ultra-definition video, CTU is introduced into Versatile Video Coding (VVC). The size of CTU is specified by an encoder and allowed to be larger than the size of the macroblock. One luma Coding Tree Block (CTB) and two chroma CTBs at a same position, together with corresponding syntax elements, form a CTU. In VVC, $L \in \{8, 16, 32, 64, 128\}$ for a luma CTB with a L×L size.

The size range of a luma CTB is: {8×8, 16×16, 32×32, 64×64, 128×128}.

The size range of a chroma CTB is: {4×4, 8×8, 16×16, 32×32, 64×64}.

In the process of high-resolution video coding, using a larger CTB can achieve a better compression effect.

3. Deblocking Filter (DBF): The image coding process is based on different blocks, and respective blocks are encoded relatively independently. Since respective blocks use different parameters, distribution characteristics in the blocks are independent of each other, resulting in discontinuity at edges of the blocks, which can be called blocking artifacts. DBF is mainly used to smooth boundaries of blocks and remove the blocking artifacts.

4. Sample Adaptive Offset (SAO): SAO sets out in a pixel domain, to classify reconstructed pictures according to their characteristics, and then perform compensation processing in the pixel domain. SAO is mainly to reduce ringing artifacts.
5. Adaptive Leveling Filter (ALF): ALF is applied after DBF and SAO, and a main purpose of ALF is to further improve image quality under objective conditions. According to characteristics of reference pixels, ALF technology constructs a multiple linear regression model based on least squares, and carries out filtering compensation in the pixel domain.
6. Wiener filtering: The essence of Wiener filtering is to minimize a mean square of estimation errors (the estimation error is defined as a difference between an expected response and an actual output of a filter).

II. Main Flow of Video Encoding and Decoding

Please refer to (a) in FIG. 1. Taking video encoding as an example, video encoding generally includes processes such as prediction, transformation, quantization, and entropy coding. Further, the encoding process can also be implemented according to the framework of (b) in FIG. 1.

Prediction can be divided into intra prediction and inter prediction. Intra prediction is to use surrounding encoded block(s) as a reference to predict a current uncoded block, so as to effectively remove spatial redundancy. Inter frame prediction is to use neighbouring encoded picture(s) to predict a current picture, so as to effectively remove temporal redundancy.

Transformation refers to transforming a picture from a spatial domain to a transform domain, and using transform coefficients to represent the picture. Most pictures include many flat regions and slowly changing regions. Appropriate transformation can transform a picture from a scattered distribution in the spatial domain to a relatively concentrated distribution in the transform domain, remove correlation in a frequency domain between signals, and cooperate with the quantization process to effectively compress bit streams.

Entropy coding is a lossless coding manner, which can transform a series of element symbols into a binary bit stream for transmission or storage. Input symbols may include quantized transform coefficients, motion vector information, prediction mode information, transform quantization related syntax, etc. Entropy coding can effectively remove redundancy of video element symbols.

The above is introduced by taking encoding as an example. Video decoding is relative to video encoding, that is, video decoding usually includes processes such as entropy decoding, prediction, inverse quantization, inverse transformation, and filtering. The implementation principle of each process is the same or similar to that of video encoding.

III. Realization of Wiener Filtering Technology

The ALF coding process can include: region division→obtaining reference pixels→region merging and calculating filter coefficients→determining whether each Largest Coding Unit (LCU) enables filtering through a CTU decision.

The parameters that need to be calculated in the whole process include: 1) a number of filtering parameters; 2) region merge flag; 3) each group of filter coefficients; 4) whether to enable a filter flag for LCU; 5) whether to enable a filter flag for a current component (Y, U, V).

Some processing and concepts in the ALF process are described in detail below.

1. Region Division

In the ALF process, for obtained reconstructed video data, data on a luma component is partitioned, and data on a chroma component is non-partitioned.

As an example, the specific implementation process of region division can be as follows: a picture is divided into 16 regions with basically equal sizes and aligned based on LCU. A width of a non-rightmost region is $(((pic\_width\_InLcus+1)/4) \times Lcu\_Width)$, where pic_width_InLcus represents the number of LCUs in the width of a picture, Lcu_Width represents the width of each LCU. The width of a rightmost region is a difference between the width of the picture and the width of three non-rightmost regions (the width of the picture minus the total width of the three non-rightmost regions).

Similarly, a height of a non-bottom region is $(((pic\_hight\_InLcus+1)/4)\ Lcu\_Height)$, where pic_height_InLcus represents the number of LCUs in the height of a picture, Lcu_Height represents the height of each LCU. The height of a bottom region is a difference between the height of the picture and the height of three non-bottom regions (the height of the picture minus the total height of the three non-bottom regions).

Figures 2, 3:
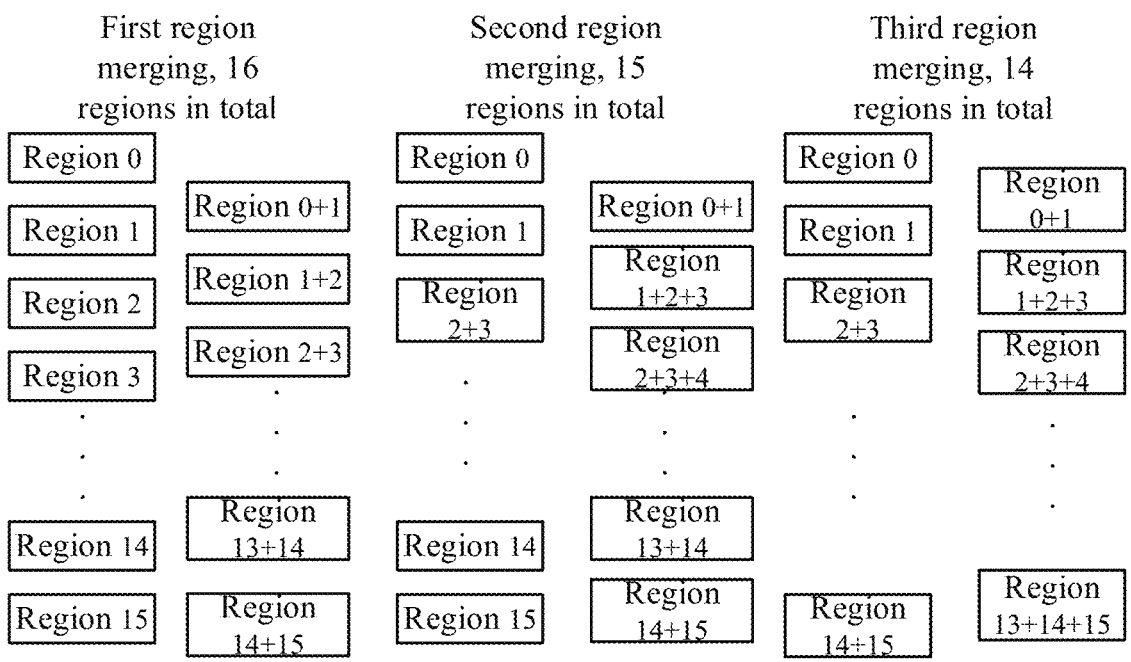
FIG. 2 is a schematic diagram illustrating region division.
FIG. 3 is a schematic diagram illustrating region merging.

After obtaining a result of region division for the whole picture, each region is assigned an index value, and the schematic diagram can be shown in FIG. 2.

2. Region Merging

Region merging operation refers to determining whether neighbouring regions are merged according to an order of index values. The purpose of merging is to reduce coding coefficients. A merge flag is required to indicate whether a current region is merged with one or more neighbouring regions.

For example, after region division is performed according to the above manner of region division, there are 16 regions (which can be referred to as 16 categories or 16 groups, index values of which are 0-15 in sequence). In a first region merging, it can be tried to merge a region 0 and a region 1, the region 1 and a region 2, the region 2 and a region 3, . . . , a region 13 and a region 14, the region 14 and a region 15 in sequence. The first region merging is performed according to the merging manner with a smallest error, so that the 16 regions are merged into 15 regions.

For the 15 regions after the first region merging (assuming that the region 2 and the region 3 are merged, and then a region 2+3 is obtained), it can be tried to merge the region 0 and the region 1, the region 1 and the region 2+3, the region 2+3 and a region 4, . . . , the region 13 and the region 14, the region 14 and the region 15 in sequence. The second region merging is performed according to the merging manner with a smallest error, so that the 15 regions are merged into 14 regions.

For the 14 regions after the second region merging (assuming that the region 14 and the region 15 are merged, and then a region 14+15 is obtained, that is, merged regions include the region 2+3 and the region 14+15), it can be tried to merge the region 0 and the region 1, the region 1 and the region 2+3, the region 2+3 and the region 4, . . . , a region 12 and the region 13, the region 13 and the region 14+15 in sequence. The third region merging is performed according to the merging manner with a smallest error, so that the 14 regions are merged into 13 regions.

By analogy, until regions are merged into one region, and the schematic diagram can be shown in FIG. 3.

After the above region merging operation is completed, the error of Wiener filtering on the whole picture can be calculated in respective cases of without region merging (16 regions in total), one-time region merging (15 regions in total), . . . , 14-time region merging (2 regions in total), and 15-time region merging (1 region in total), and the region merging manner with a lowest error can be determined as a final region merging manner.

3. Reference Pixel and Filter Coefficient

After region division is performed in the above manner, based on reference pixels of each pixel in each region, filter coefficients can be calculated according to the principle of Wiener filtering.

Figure 4:
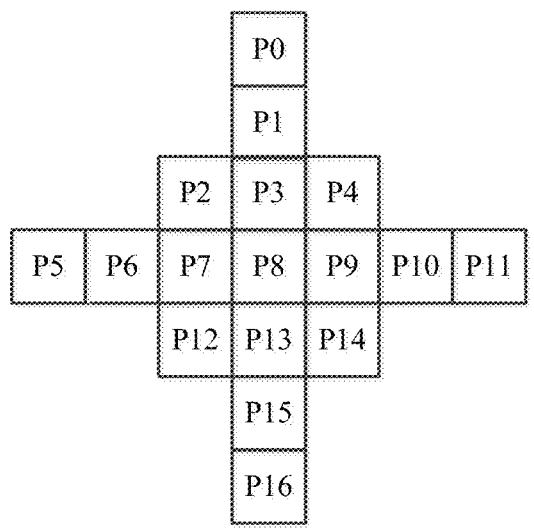
FIG. 4 is a schematic diagram illustrating reference pixel positions.

For example, taking a first Wiener filter as an example, the selection of reference pixels is shown in FIG. 4. Since the filter satisfies the central symmetry, the selection of reference pixels is:

$$E[i]=(P_i+P_{16-i})$$

$$E[8]=P_8$$

where $P_i$ represents a pixel value of a reconstructed picture before filtering, E[i] represents a value of a reference pixel, i=0, 1, 2, 3, 4, 5, 6, 7.

The goal of Wiener filtering is linear combination for values of the reference pixels so that a result obtained by the linear combination approaches a pixel value of the original picture.

Figure 5:
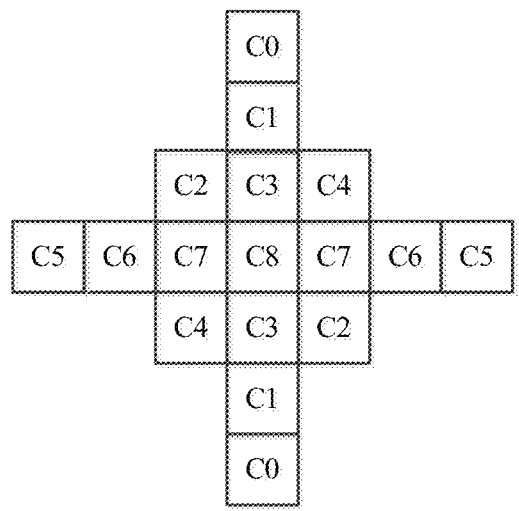
FIG. 5 is a schematic diagram illustrating a first Wiener filter.

For example, taking the first Wiener filter as an example, the shape of the filter is shown in FIG. 5, which is a filter with a shape of a 7*7 cross plus a 3*3 square. The filter is designed to be a centrosymmetric filter, and an encoding device only needs to transmit 9 filter coefficients to a decoding device.

Where C0-C7 are 7-bit signed numbers with a value range of (−1, 1), and C8 is 7-bit unsigned number with a value range of (0, 2).

The ALF technology is based on Largest Coding Unit (LCU) for processing. LCUs belonging to a same merged region use a same group of filter coefficients for filtering.

4. Adaptive Leveling Filter Unit

Figure 14:
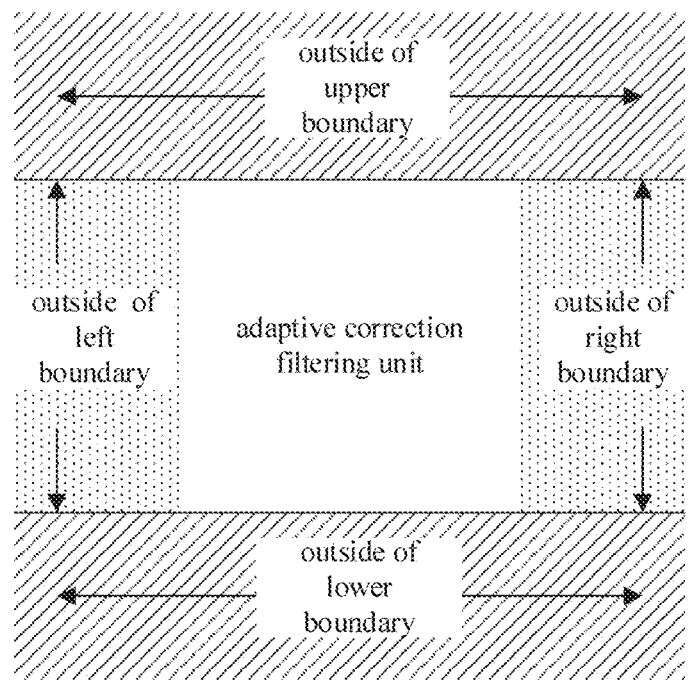
FIG. 14 is a schematic diagram illustrating a sample filtering compensation unit according to an exemplary embodiment of the present disclosure.

As shown in FIG. 14, the adaptive leveling filter unit is derived from a current LCU in the following steps:

4.1. The part of the sample region containing a current LCU C that is outside the picture is removed to obtain a sample region D.

4.2. If a sample containing a lower boundary of the sample region D does not belong to a lower boundary of the picture, the lower boundary of luma component and chroma component sample region D is moved upwards by four rows to obtain a sample region E1; otherwise, let E1 be equal to D. The sample of the last row of the sample region D is the lower boundary of the sample region E1.

4.3. If a sample containing an upper boundary of the sample region E1 belongs to the upper boundary of the picture, or it belongs to patch boundary and the value of cross_patch_loop_filter_enable_flag is '0', let E2 be equal to E1; otherwise, the upper boundary of luma component and chroma component sample region E1 is extended upwards by four rows to obtain a sample region E2. The sample of the first row of the sample region E1 is the upper boundary of the sample region E2.

4.4. The sample region E2 is used as the current adaptive leveling filter unit. The sample of the first row of the picture is the upper boundary of the picture; the sample of the last row of the picture is the lower boundary of the picture.

5. Adaptive Leveling Filtering Operation

If a sample used in the adaptive leveling filtering process is a sample in the adaptive leveling filter unit, the sample is directly used for filtering; otherwise, filtering is performed as follows.

5.1. If the sample used in the adaptive leveling filtering process is outside a boundary of the picture, or outside a patch boundary and the value of cross_patch_loop_filter_enable_flag is '0', a sample nearest to this sample in the adaptive leveling filter unit is used to replace this sample for filtering;

5.2. Otherwise, if the sample used in the adaptive leveling filtering process is outside an upper boundary or a lower boundary of the adaptive leveling filter unit, a sample nearest to this sample in the adaptive leveling filter unit is used to replace this sample for filtering;

5.3. If the sample used in the adaptive leveling filtering process is not outside the upper boundary of the adaptive leveling filter unit or outside the lower boundary of the adaptive leveling filter unit, the sample is directly used for filtering.

6. Coding Tree Unit (CTU) Decision

After region merging is performed and filter coefficients of each region are calculated, it needs to make a CTU decision. The CTU decision is also based on LCU to determine whether each LCU in the current picture uses ALF (that is, whether to enable Wiener filtering).

Rate-distortion costs before and after a current LCU enables ALF are calculated to determine whether the current LCU uses ALF. If the current LCU is marked as using ALF, Wiener filtering is performed on each pixel in the LCU.

In the related art, according to the principle of Wiener filtering, a few filter coefficients are trained at an encoding end and transmitted to a decoding end to filter a reconstructed picture sequence, so as to improve image quality. Due to a large number of pixels of a picture, but a few filter coefficients, a model established by the ALF technology will have an under-fitting condition when processing most pictures. Therefore, there is still room for improving image quality by using the ALF technology.

For example, for an encoding device, after intra/inter prediction, transformation, quantization, inverse quantization and inverse transformation can be performed on prediction results in sequence to obtain a reconstructed picture sequence.

For a decoding device, entropy decoding, inverse quantization and inverse transformation can be performed on the bit stream in sequence to obtain the reconstructed picture sequence.

In order to optimize the Wiener filtering effect and improve the encoding and decoding performance, the embodiments of the present disclosure consider improving the existing Wiener filtering technology from the following aspects.

1. Through finer region division or increasing filter coefficients, the degree of under-fitting of the model established by the ALF technology in image processing can be alleviated, but at the same time, more information needs to be transmitted to the decoding end, which will increase the bit rate. Therefore, the method of appropriately increasing filter coefficients can be adopted for filtering.

2. Since the ALF technology can improve the reconstruction quality of a picture, and a first ALF has under-fitting, a two-time Wiener filtering method can be introduced to re-correct and train a group of filter coefficients for the picture after a first filtering, and another filtering is performed, so as to improve image quality.

3. Since the shape of a filter is fixed, the relationship between reference pixels at some positions and a pixel to be filtered is not so close, or there may be a collinearity of the reference pixels, resulting in coefficients obtained from the training being not optimal. Therefore, the idea of stepwise regression can be adopted. After three CTU decisions, one CTU decision is added. Reference pixels at one or more positions with a filter coefficient of a value 0 do not participate in the calculation of filter coefficients.

In order to make the above purposes, features and advantages of the embodiments of the present disclosure more obvious and easy to understand, the technical solution in the embodiments of the present disclosure will be further described in detail in combination with the accompanying drawings.

Embodiment 1: Increasing Filter Coefficients

The method of changing the shape of a filter and appropriately increasing filter coefficients is adopted for filtering to alleviate the degree of under-fitting of the model established by the ALF technology in image processing.

It should be noted that the filtering method described in Embodiment 1 can be applied to both the encoding device and the decoding device.

Figure 6A:
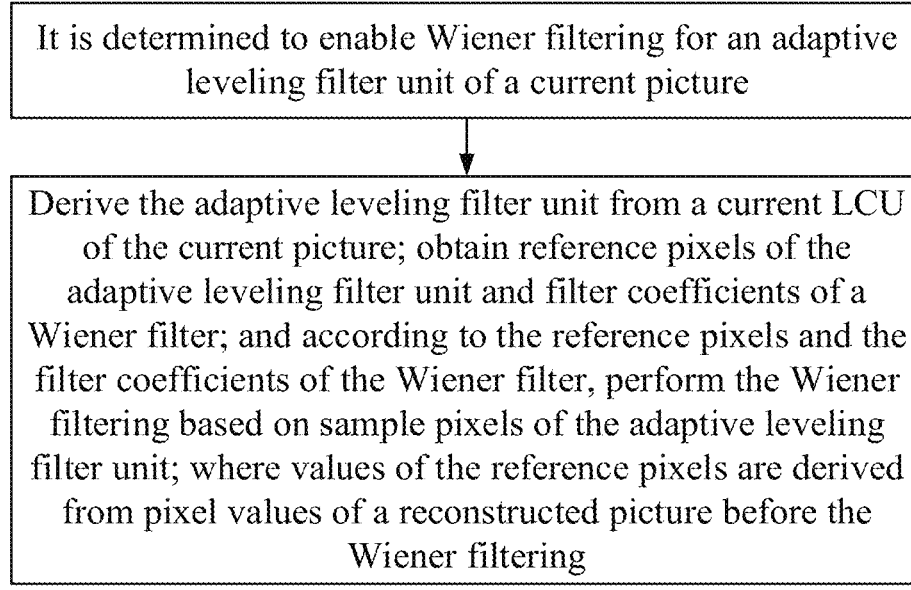
FIG. 6A is a schematic flowchart illustrating a filtering method according to an exemplary embodiment of the present disclosure.

Please refer to FIG. 6A, which is a flowchart illustrating a filtering method according to an exemplary embodiment of the present disclosure. As shown in FIG. 6A, the filtering method can include the following steps.

In step S600, when it is determined to enable Wiener filtering for an adaptive leveling filter unit of a current picture, the adaptive leveling filter unit is derived from a current Largest Coding Unit (LCU) of the current picture; reference pixels of the adaptive leveling filter unit and filter coefficients of a Wiener filter are obtained; and according to the reference pixels and the filter coefficients of the Wiener filter, the Wiener filtering is performed based on sample pixels of the adaptive leveling filter unit; where the Wiener filter is a centrosymmetric filter with a shape of a 7*7 cross plus a 5*5 square, and values of the reference pixels are derived from pixel values of a reconstructed picture before the Wiener filtering.

Figure 6B:
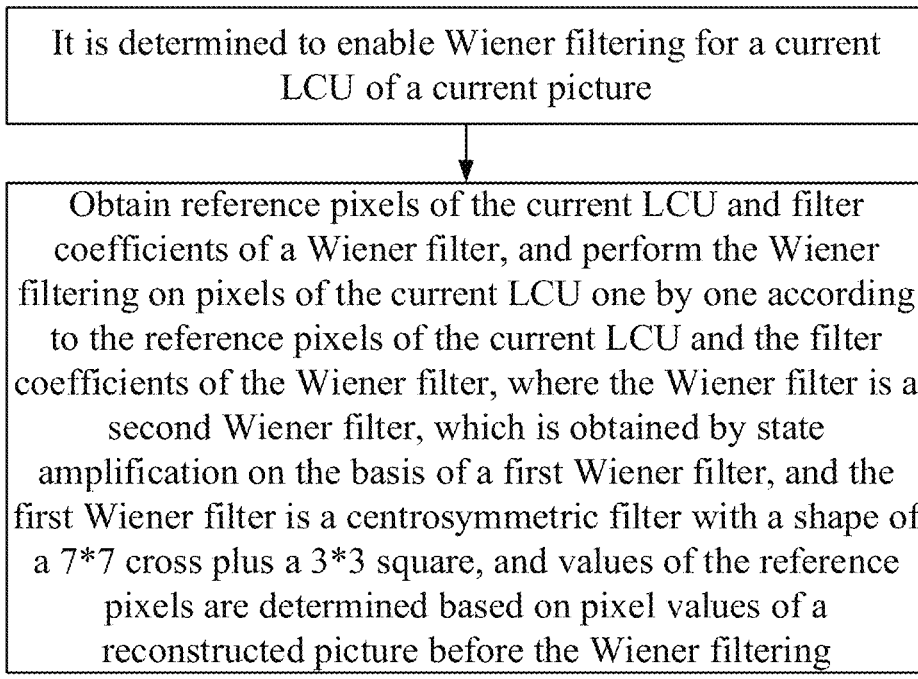
FIG. 6B is a schematic flowchart illustrating another filtering method according to an exemplary embodiment of the present disclosure.

Please refer to FIG. 6B, which is a flowchart illustrating another filtering method according to an exemplary embodiment of the present disclosure. As shown in FIG. 6B, the filtering method can include the following steps.

Step S601: when it is determined to enable Wiener filtering for a current LCU of a current picture, reference pixels of the current LCU and filter coefficients of a Wiener filter are obtained, and the Wiener filtering is performed on pixels of the current LCU one by one according to the reference pixels of the current LCU and the filter coefficients of the Wiener filter. For example, the Wiener filter is a second Wiener filter, which is obtained by shape amplification on the basis of a first Wiener filter. The first Wiener filter is a centrosymmetric filter with a shape of a 7*7 cross plus a 3*3 square, and values of the reference pixels are determined based on pixel values of a reconstructed picture before the Wiener filtering.

It should be noted that in the embodiments of the present disclosure, unless otherwise specified, the mentioned current picture refers to a reconstructed picture.

In addition, before performing Wiener filtering on the current picture, whether to perform DBF processing or/and SAO processing on the current picture can be determined as required, and the specific implementation will not be repeated herein.

When the DBF processing or/and the SAO processing are performed on the current picture, the current picture mentioned in the embodiments of the present disclosure can be a reconstructed picture after the DBF processing or/and the SAO processing. When the DBF processing and the SAO processing are not performed on the current picture, the current picture mentioned in the embodiments of the present disclosure can be a reconstructed picture obtained after the above inverse quantization and inverse transformation processing.

Further, unless otherwise specified, Wiener filtering of the LCU described below can include Wiener filtering of a luma component (Y component) and a chroma component (U component and V component) of each pixel of the LCU. However, when performing the Wiener filtering on the former (Y component), processing such as region division and region merging are required, while performing the Wiener filtering on the latter (U component and V component), region division or region merging is not required.

In the embodiment of the present disclosure, in order to optimize the filtering effect and improve the encoding and decoding performance, filter coefficients of the Wiener filter can be appropriately increased to obtain a new Wiener filter, so as to alleviate the under-fitting condition when a picture is processed by the ALF technology.

As an example, a new Wiener filter (referred to as the second Wiener filter herein) can be obtained by shape amplification on the basis of the centrosymmetric filter (referred to as the first Wiener filter herein, and the schematic diagram can be shown in FIG. 5) with the shape of a 7*7 cross plus a 3*3 square.

When it is determined to enable the Wiener filtering for the current LCU of the current picture, the encoding/decoding device can obtain the reference pixels of the current LCU and the filter coefficients of the second Wiener filter, and perform the Wiener filtering on the pixels of the current LCU one by one according to the obtained reference pixels and the filter coefficients.

In an example, the second Wiener filter is a centrosymmetric filter with a shape of a 7*7 cross plus a 5*5 square.

In an example, as shown in FIG. 7, the second Wiener filter includes 15 filter coefficients.

As an example, corresponding to the second Wiener filter shown in FIG. 7, reference pixel positions can be as shown in FIG. 8, and the reference pixel positions of the reconstructed picture for obtaining values of the reference pixels match the shape of filter coefficients of the second Wiener filter.

In an example, before it is determined to enable the Wiener filtering for the current LCU of the current picture in step S601, the method can further include: whether to filter the current picture is determined; when determining to filter the current picture, whether to enable the Wiener filtering for the current LCU is determined, and when determining to enable the Wiener filtering for the current LCU, the step of obtaining the reference pixels of the current LCU and the filter coefficients of the Wiener filter, and performing the Wiener filtering on the pixels of the current LCU one by one according to the reference pixels of the current LCU and the filter coefficients of the Wiener filter is performed.

As an example, before performing the Wiener filtering on the current LCU, it can be determined whether to filter the current picture.

As an example, for the encoding device, determining whether to filter a picture can include: determining whether to filter the picture based on rate-distortion costs of the picture before and after filtering, and the specific implementation will not be repeated herein.

In response to determining to filter the current picture, it can be determined whether each LCU in the current picture enables Wiener filtering.

As an example, the encoding device can determine whether to enable the Wiener filtering for an LCU based on a CTU decision.

For the decoding device, whether to filter the current picture can be determined based on a value of a frame-level filter flag carried in the received encoded bit stream of the current picture. When it is determined to filter the current picture, it can be determined whether to perform Wiener filtering on a corresponding LCU based on a value of an LCU-level filter flag in the bit stream.

As an example, when it is determined to enable Wiener filtering for the current LCU, Wiener filtering can be performed on the current LCU in the manner described in the above embodiments.

Embodiment 2: Adding A Filtering Process

By the method of introducing a second filtering, a group of filter coefficients are re-corrected and trained for a picture after a first filtering, and another filtering is performed, so as to further improve image quality.

It should be noted that the filtering method described in Embodiment 2 can be applied to both the encoding device and the decoding device.

Figure 9:
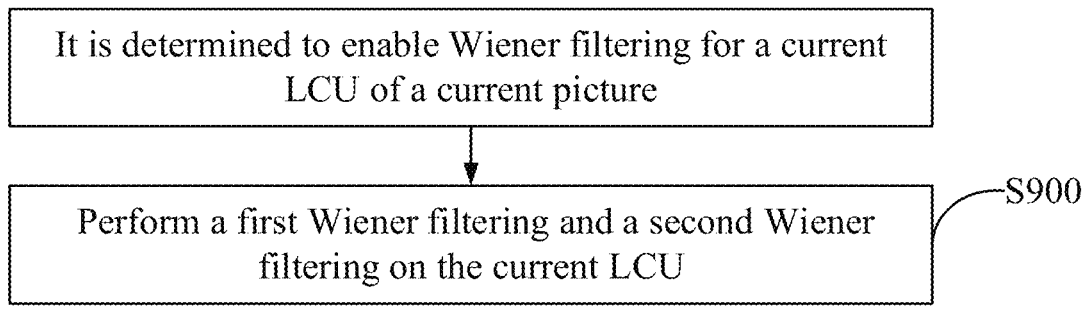
FIG. 9 is a schematic flowchart illustrating yet another filtering method according to an exemplary embodiment of the present disclosure.

Please refer to FIG. 9, which is a flowchart illustrating a filtering method according to an exemplary embodiment of the present disclosure. As shown in FIG. 9, the filtering method can include the following step.

Step S900: when it is determined to enable Wiener filtering for a current LCU of a current picture, a first Wiener filtering and a second Wiener filtering are performed on the current LCU.

In the embodiment of the present disclosure, for an LCU that enables Wiener filtering, Wiener filtering can be performed twice (referred to as the first Wiener filtering and the second Wiener filtering herein).

When it is determined to enable Wiener filtering for the current LCU of the current picture, the first Wiener filtering and the second Wiener filtering can be performed on the current LCU.

In an example, performing the first Wiener filtering and the second Wiener filtering on the current LCU can include:

obtaining Wiener filter coefficients of a Wiener filter and reference pixels for the first Wiener filtering on the current LCU, and Wiener filter coefficients and reference pixels for the second Wiener filtering on the current LCU, and according to the Wiener filter coefficients and the reference pixels for the first Wiener filtering and the Wiener filter coefficients and the reference pixels for the second Wiener filtering, performing the first Wiener filtering and the second Wiener filtering on pixels of the current LCU one by one.

In an example, for the encoding device, the filter coefficients of the Wiener filter can be determined by calculation. For the decoding device, the filter coefficients of the Wiener filter can be obtained from the bit stream.

In an example, before the first Wiener filtering and the second Wiener filtering are performed on the current LCU in step S900, the method can further include:

whether to filter the current picture is determined;

in response to determining to filter the current picture, whether to enable Wiener filtering for the current LCU is determined, and in response to determining to enable the Wiener filtering for the current LCU, the step of performing the first Wiener filtering and the second Wiener filtering on the current LCU is determined to be performed.

As an example, whether a picture needs to be filtered can be identified by a frame-level filter flag, and whether to enable Wiener filtering for an LCU can be identified by an LCU-level filter flag.

The encoding device can inform the decoding device whether to filter the current picture through the frame-level filter flag, and the decoding device can determine whether to filter the current picture according to a value of the frame-level filter flag in the bit stream.

Similarly, the encoding device can inform whether to enable Wiener filtering for the current LCU through the LCU-level filter flag, and the decoding device can determine whether to enable the Wiener filtering for the current LCU according to a value of the LCU-level filter flag in the bit stream.

As an example, the encoding device determines whether to filter a picture, which can refer to the relevant implementation in the traditional filtering solution. For example, whether to filter the picture can be determined based on rate-distortion costs of the picture before and after filtering, and the specific implementation will not be repeated herein.

In response to determining to filter the current picture, it can be determined whether each LCU in the current picture enables Wiener filtering.

As an example, the encoding device can determine whether to enable the Wiener filtering for an LCU based on a CTU decision.

In response to determining to filter the current picture and enable the Wiener filtering for a current LCU, the encoding/decoding device can obtain Wiener filter coefficients of a Wiener filter and reference pixels for the first Wiener filtering on the current LCU, and Wiener filter coefficients and reference pixels for the second Wiener filtering on the current LCU, and perform the first Wiener filtering and the second Wiener filtering on pixels of the current LCU one by one according to the obtained filter coefficients and the reference pixels.

It should be noted that, in order to improve the filtering efficiency, when Wiener filtering is performed on the current LCU, the first Wiener filtering and the second Wiener filtering can be performed on a next pixel after the first Wiener filtering and the second Wiener filtering are performed on a current pixel, so that Wiener filtering can be performed twice on each pixel while the pixel is read only once, reducing times of reading pixels.

In another example, before the first Wiener filtering and the second Wiener filtering are performed on the current LCU in step S900, the method can further include:

whether to perform a first filtering on the current picture and whether to perform a second filtering on the current picture are determined;

in response to determining to perform the first filtering on the current picture and perform the second filtering on the current picture, whether to enable a first Wiener filtering for the current LCU and whether to enable a second Wiener filtering for the current LCU are determined; and in response to determining to enable the first Wiener filtering for the current LCU and enable the second Wiener filtering for the current LCU, the step of performing the first Wiener filtering and the second Wiener filtering on the current LCU is determined to be performed.

As an example, it is necessary to respectively determine whether to perform the first filtering on the current picture and whether to perform the second filtering on the current picture. If it is determined to perform the first filtering or/and the second filtering on the current picture, it is necessary to determine whether to enable the first Wiener filtering for the current LCU and whether to enable the second Wiener filtering for the current LCU.

As an example, whether to need to perform the first filtering and the second filtering on a picture can be identified respectively by two frame-level filter flags, and whether to enable the first Wiener filtering and the second Wiener filtering for an LCU can be identified respectively by two LCU-level filter flags.

The encoding device can inform the decoding device whether to perform the first filtering and the second filtering on the current picture through the frame-level filter flags. The decoding device can determine whether to perform the first filtering and the second filtering on the current picture according to values of the frame-level filter flags in the bit stream.

Similarly, the encoding device can indicate whether to enable the first Wiener filtering and the second Wiener filtering for the current LCU through the LCU-level filter flags, and the decoding device can determine whether to enable the first Wiener filtering and the second Wiener filtering for the current LCU according to values of the LCU-level filter flags in the bit stream.

As an example, the encoding device can determine whether to perform the first Wiener filtering and the second filtering on a picture based on rate-distortion costs of the picture before and after filtering, and the specific implementation will not be repeated herein.

In response to determining to perform the first filtering and the second filtering on the current picture, whether to enable the first Wiener filtering for the current LCU and whether to enable the second Wiener filtering for the current LCU can be respectively determined.

As an example, the encoding device can determine whether to enable the first Wiener filtering or the second Wiener filtering for an LCU based on a CTU decision.

It should be noted that, in the embodiments of the present disclosure, for the picture, the first filtering can be performed on the current picture without performing the second filtering; or, the second filtering can be performed on the current picture without performing the first filtering; or, neither the first filtering nor the second filtering is performed on the current picture.

For the LCU, the first Wiener filtering can be enabled for the current LCU without enabling the second Wiener filtering; or, the second Wiener filtering can be enabled for the current LCU without enabling the first Wiener filtering; or, neither the first Wiener filtering nor the second Wiener filtering is enabled for the current LCU.

The coding device respectively indicates to the decoding device, through the above two frame-level filter flags and two LCU-level filter flags, whether to perform the first filtering or/and the second filtering on the current picture, and whether to enable the first Wiener filtering or/and the second Wiener filtering for the current LCU in the case of performing the first filtering or/and the second filtering on the current picture.

In an example, the Wiener filter that performs the first Wiener filtering on the current LCU and the Wiener filter that performs the second Wiener filtering on the current LCU are both a first Wiener filter; or, the Wiener filter that performs the first Wiener filtering on the current LCU and the Wiener filter that performs the second Wiener filtering on the current LCU are both a second Wiener filter; or, the Wiener filter that performs the first Wiener filtering on the current LCU is the first Wiener filter, and the Wiener filter that performs the second Wiener filtering on the current LCU is the second Wiener filter; or, the Wiener filter that performs the first Wiener filtering on the current LCU is the second Wiener filter, and the Wiener filter that performs the second Wiener filtering on the current LCU is the first Wiener filter.

As an example, when performing the first Wiener filtering or the second Wiener filtering on the current LCU, the Wiener filter used can be selected from the first Wiener filter or the second Wiener filter, and the specific Wiener filter used can be indicated by a configuration instruction.

As an example, the second Wiener filter is obtained by shape amplification on the basis of the first Wiener filter. The first Wiener filter is a centrosymmetric filter with a shape of a 7*7 cross plus a 3*3 square, and the schematic diagram can be shown in FIG. 5.

As an example, the second Wiener filter is a centrosymmetric filter with a shape of a 7*7 cross plus a 5*5 square, and the schematic diagram can be shown in FIG. 7.

In an example, values of the reference pixels for the first Wiener filtering on the current LCU are obtained from a first reconstructed picture in a first manner, and the first reconstructed picture is a reconstructed picture before the first Wiener filtering;

values of reference pixels for the second Wiener filtering on the current LCU are obtained from the first reconstructed picture in a second manner.

As an example, both the values of the reference pixels for the first Wiener filtering on the current LCU and the values of the reference pixels for the second Wiener filtering on the current LCU can be obtained from the reconstructed picture before the first Wiener filtering (referred to as the first reconstructed picture herein).

As an example, the values of the reference pixels for the first Wiener filtering on the current LCU can be obtained from the first reconstructed picture in the first manner.

The values of the reference pixels for the first Wiener filtering on the current LCU can be obtained from the first reconstructed picture in the second manner.

As an example, the first manner can be obtaining values of reference pixels from reference pixel positions of the first reconstructed picture based on the reference pixel positions shown in FIG. 4 and the shape of the first Wiener filter shown in FIG. 5:

$E[i]=(P_i+P_{16-i})$ $E[8]=P_8$ where $P_i$ represents a pixel value of a reconstructed picture before filtering, $E[i]$ represents a value of a reference pixel, i=0, 1, 2, 3, 4, 5, 6, 7.

As an example, the second manner can be:

values of reference pixels corresponding to each pixel in the current LCU are determined based on absolute values of differences between pixel values at respective reference pixel positions and a pixel value at a central position in the first reconstructed picture.

For example, taking reference pixel positions shown in FIG. 4 as an example, obtaining values of the reference pixels from the first reconstructed picture in the second manner can be realized by the following strategies:

$$E[i]=\text{abs}(P_i-P_8)+\text{abs}(P_{16-i}-P_8)$$

$$E[8]=1$$

where $P_i$ represents a pixel value of the first reconstructed picture, E[i] represents a value of a reference pixel, i=0, 1, 2, 3, 4, 5, 6, 7.

For another example, taking reference pixel positions shown in FIG. 8 as an example, obtaining values of the reference pixels from the first reconstructed picture in the second manner can be realized by the following strategies:

$$E[i]=\text{abs}(P_i-P_{14})+\text{abs}(P_{28-i}-P_{14})$$

$$E[14]=1$$

where $P_i$ represents a pixel value of the first reconstructed picture, E[i] represents a value of a reference pixel, i=0, 1, 2, 3, 4, 5, 6, 7, 8, 9, 10, 11, 12, 13.

It should be noted that E[8]=1 or E[14]=1 is only a way to obtain the value of a reference pixel, which is not limited in the embodiments of the present disclosure. That is, in the embodiments of the present disclosure, the value of E[8] (or E[14]) can also be other pixel values (not exceeding a maximum pixel value), or the value of E[8] (or E[14]) can also be P8 (P14).

As an example, when performing the second Wiener filtering, the values of the reference pixels are determined based on the absolute values of the differences between the pixel values at respective reference pixel positions and the pixel value at the central position in the first reconstructed picture, so that the linear combination for the values of the reference pixels is realized through the second Wiener filtering, which makes a result obtained by the linear combination approaches a difference between values of a pixel of the original picture and the corresponding pixel after the first filtering.

For any pixel, when the first Wiener filtering and the second Wiener filtering of the pixel are completed, if the used reconstructed pictures are both the first reconstructed picture, a sum of the pixel value obtained after the first Wiener filtering of the pixel and the pixel value obtained after the second Wiener filtering of the pixel can be determined to be the pixel value obtained by filtering the pixel.

For any pixel, when the first Wiener filtering and the second Wiener filtering of the pixel are completed, if the first filtering adopts the first manner to obtain values of reference pixels (close to pixel values in the original picture), and the second filtering adopts the second manner to obtain values of the reference pixels (close to differences between the respective pixel values obtained after the first filtering and the corresponding pixel values in the original picture), a final filtering result can be obtained by superimposing a filtering result of the first filtering and a filtering result of the second filtering.

As an example, when performing the first Wiener filtering and second Wiener filtering on an LCU, if values of reference pixels for both of them are obtained from the first reconstructed picture, the first Wiener filtering on the current LCU and the second Wiener filtering on the current LCU can be performed in parallel to increase the filtering efficiency.

In another example, values of the reference pixels for the first Wiener filtering on the current LCU are determined based on pixel values of the first reconstructed picture, which is a reconstructed picture before the first Wiener filtering;

values of the reference pixels for the second Wiener filtering on the current LCU are determined based on pixel values of a second reconstructed picture, which is a reconstructed picture after the first Wiener filtering.

As an example, the values of the reference pixels for the first Wiener filtering on the current LCU and the values of the reference pixels for the second Wiener filtering on the current LCU can be obtained from the reconstructed picture before the first Wiener filtering (i.e., the first reconstructed picture) and the reconstructed picture after the first Wiener filtering (referred to as the second reconstructed picture herein) respectively.

As an example, the values of the reference pixels for the second Wiener filtering on the current LCU are determined based on absolute values of differences between pixel values at respective reference pixel positions and a pixel value at a central position in the second reconstructed picture.

In an example, when performing the second Wiener filtering, the values of the reference pixels are determined based on the absolute values of the differences between the pixel values at respective reference pixel positions and the pixel value at the central position in the second reconstructed picture, so that the linear combination for the values of the reference pixels is realized through the second Wiener filtering, which makes the result obtained by the linear combination approaches a difference between values of a pixel of the original picture and the corresponding pixel after the first filtering.

For any pixel, when the first Wiener filtering and the second Wiener filtering of the pixel are completed, a sum of the pixel value obtained after the first Wiener filtering of the pixel and the pixel value obtained after the second Wiener filtering of the pixel can be determined to be the pixel value obtained by filtering the pixel.

In an example, before the first Wiener filtering and the second Wiener filtering are performed on the current LCU in step S900, the method can further include:

region division is performed on the current picture according to a position of the LCU in the current picture, LCUs belonging to one region being configured with same filtering parameters, and filtering parameters including a filter for Wiener filtering and corresponding filter coefficients, as well as position indexes of the reference pixels. Manners of region division include but are not limited to one manner.

In an example, the specific implementation of performing region division on a picture can refer to the relevant implementation in the traditional filtering solution, which will not be repeated in the embodiments of the present disclosure.

It should be noted that in the embodiment of the present disclosure, when the first filtering and the second filtering are performed on the current picture, the manner of region division can be different, and the Wiener filter selected for Wiener filtering on each LCU in the picture can also be different.

In an example, when the filtering method shown in FIG. 9 is applied to the encoding device, the method can further include:

when three CTU decisions are completed, for an LCU which is determined to enable Wiener filtering after the three CTU decisions, a first group of filter coefficients for Wiener filtering on the LCU reserved after the three CTU decisions are obtained, values of reference pixels at one or more reference pixel positions with a filter coefficient of a value 0 are set to 0, and a second group of filter coefficients are calculated based on updated values of the reference pixels; and a fourth CTU decision is made according to the second group of filter coefficients to determine whether each LCU of the current picture enables Wiener filtering.

As an example, when the first filtering or the second filtering is performed on the current picture, the encoding device can determine, through three CTU decisions, one or more LCUs that enable Wiener filtering in the current picture. That is, the encoding device can determine whether an LCU enables the first Wiener filtering through three CTU decisions, and determine whether the LCU enables the second Wiener filtering through three CTU decisions.

Considering that the relationship between reference pixels at some positions and a pixel to be filtered is not so close, or there may be a collinearity of the reference pixels, resulting in coefficients obtained from the training being not optimal. Therefore, in order to optimize the training effect of filter coefficients, in the process of determining whether each LCU enables the first Wiener filtering (or the second Wiener filtering) through the CTU decisions, when completing three CTU decisions, the encoding device can determine one or more LCUs that enable the first Wiener filtering (or the second Wiener filtering) based on the CTU decisions. Based on the filter coefficients (referred to as the first group of filter coefficients herein) for Wiener filtering on the LCUs reserved after the three CTU decisions, the encoding device can set values of reference pixels at one or more reference pixel positions with a filter coefficient of a value 0 to 0, and values of reference pixels at one or more reference pixel positions with the filter coefficient of a non-zero value are unchanged. The values of the reference pixels are updated, and new filter coefficients (referred to as the second group of filter coefficients herein) are calculated based on the updated values of the reference pixels.

When obtaining the second group of filter coefficients, the fourth CTU decision can be made according to the second group of filter coefficients to determine whether each LCU of the current picture enables Wiener filtering.

In another example, when the filtering method shown in FIG. 9 is applied to the encoding device, the method can further include:

each time a CTU decision is completed, for an LCU which is determined to enable Wiener filtering after the CTU decision, a first group of filter coefficients for Wiener filtering on the LCU reserved after the CTU decision are obtained, values of reference pixels at one or more reference pixel positions with a filter coefficient of a value 0 are set to 0, and a second group of filter coefficients are calculated based on updated values of the reference pixels; and a next CTU decision is made according to the second group of filter coefficients to determine whether each LCU of the current picture enables Wiener filtering.

In an example, considering that the relationship between reference pixels at some positions and a pixel to be filtered is not so close, or there may be a collinearity of the reference pixels, resulting in coefficients obtained from the training being not optimal. Therefore, in order to optimize the training effect of filter coefficients, after every CTU decision, for an LCU which is determined to enable the first Wiener filtering (or the second Wiener filtering) based on this CTU decision, based on the filter coefficients (referred to as the first group of filter coefficients herein) for Wiener filtering on the LCU reserved after this CTU decision, the encoding device can set values of reference pixels at one or more reference pixel positions with a filter coefficient of a value 0 to 0, and values of reference pixels at one or more reference pixel positions with the filter coefficient of a non-zero value are unchanged. The values of the reference pixels are updated, and new filter coefficients (referred to as the second group of filter coefficients herein) are calculated based on the updated values of the reference pixels.

When the second group of filter coefficients are obtained, the next CTU decision can be made according to the second group of filter coefficients to determine whether each LCU of the current picture enables Wiener filtering.

It should be noted that in the embodiment of the present disclosure, every time the second group of filter coefficients are calculated, the rate-distortion cost of filtering the current picture based on the first group of filter coefficients can also be compared with the rate-distortion cost of filtering the current picture based on the second group of filter coefficients. If the former is smaller, the first group of filter coefficients will be reserved; otherwise, the second group of filter coefficients will be reserved.

Embodiment 3: Adding One CTU Decision

The idea of stepwise regression is adopted. After three CTU decisions, one CTU decision is added. Reference pixels at the one or more positions with a coefficient of a value 0 do not participate in the calculation of filter coefficients, and filter coefficients obtained from the training are optimized.

It should be noted that the filtering method described in Embodiment 3 can be applied to an encoding device.

Figure 10:
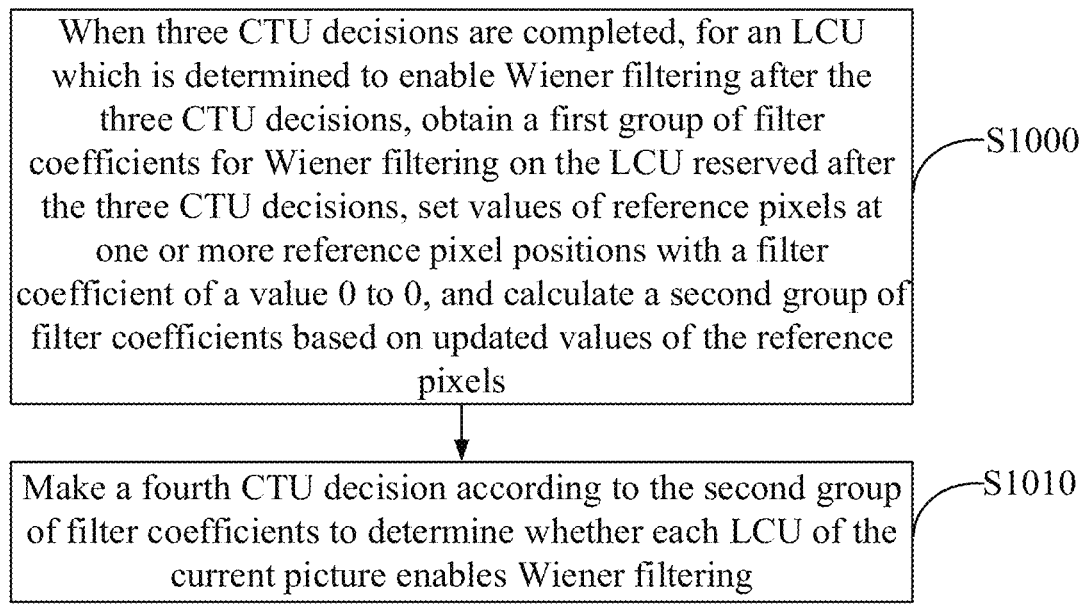
FIG. 10 is a schematic flowchart illustrating yet another filtering method according to an exemplary embodiment of the present disclosure.

Please refer to FIG. 10, which is a flowchart illustrating a filtering method according to an exemplary embodiment of the present disclosure. As shown in FIG. 10, the filtering method can include the following steps.

Step S1000: when three CTU decisions are completed, for an LCU which is determined to enable Wiener filtering after the three CTU decisions, a first group of filter coefficients for Wiener filtering on the LCU reserved after the three CTU decisions are obtained, values of reference pixels at one or more reference pixel positions with a filter coefficient of a value 0 are set to 0, and a second group of filter coefficients are calculated based on updated values of the reference pixels.

Step S1010: a fourth CTU decision is made according to the second group of filter coefficients to determine whether each LCU of the current picture enables Wiener filtering.

In the embodiment of the present disclosure, considering that the relationship between reference pixels at some positions and a pixel to be filtered is not so close, or there may be a collinearity of the reference pixels, resulting in coefficients obtained from the training being not optimal. Therefore, in order to optimize the training effect of filter coefficients, in the process of determining whether each LCU enables the Wiener filtering through the CTU decisions, when completing three CTU decisions, the encoding device can determine one or more LCUs that enable the Wiener filtering based on the CTU decisions. Based on the filter coefficients (referred to as a first group of filter coefficients herein) for Wiener filtering on the LCUs reserved after the three CTU decisions, the encoding device can set values of reference pixels at one or more reference pixel positions with a filter coefficient of a value 0 to 0, and values of reference pixels at one or more reference pixel positions with the filter coefficient of a non-zero value are unchanged. The values of the reference pixels are updated, and new filter coefficients (referred to as the second group of filter coefficients herein) are calculated based on the updated values of the reference pixels.

When obtaining the second group of filter coefficients, the fourth CTU decision can be made according to the second group of filter coefficients to determine whether each LCU of the current picture enables Wiener filtering.

It should be noted that in the embodiment of the present disclosure, when calculating the second group of filter coefficients, the rate-distortion cost of filtering the current picture based on the first group of filter coefficients can also be compared with the rate-distortion cost of filtering the current picture based on the second group of filter coefficients. If the former is smaller, the first group of filter coefficients will be reserved; otherwise, the second group of filter coefficients will be reserved.

In addition, when the updated filter coefficients are reserved, the encoding device can also update a result of region merging based on the updated filter coefficients, and the specific implementation will not be described herein.

In an example, the filtering method shown in FIG. 10 may further include:

when it is determined to enable Wiener filtering for a current LCU in the current picture, filter coefficients of a Wiener filter and reference pixels for Wiener filtering on the current LCU are obtained, and the Wiener filtering is performed on pixels in the current LCU one by one according to the filter coefficients of the Wiener filter and the reference pixels for the Wiener filtering on the current LCU.

In the embodiment of the present disclosure, when it is determined to enable Wiener filtering for a current LCU in the current picture, filter coefficients of a Wiener filter and reference pixels for Wiener filtering on the current LCU can be obtained, and the Wiener filtering can be performed on pixels in the current LCU one by one.

In the embodiment of the present disclosure, in order to optimize the filtering effect and improve the encoding and decoding performance, a new Wiener filter can be obtained by appropriately increasing filter coefficients of the Wiener filter, so as to alleviate the under-fitting condition when a picture is processed by the ALF technology. For the specific implementation, please refer to the relevant description in Embodiment 1 or Embodiment 2, which will not be repeated in the embodiment of the present disclosure.

In an example, by the method of introducing a second filtering, a group of filter coefficients are re-corrected and trained for a picture after a first filtering, and another filtering is performed, so as to further improve image quality. For the specific implementation, please refer to the relevant description in Embodiment 2, which will not be repeated in the embodiment of the present disclosure.

In an example, before three CTU decisions are completed in step S1000, the method can further include:

each time a CTU decision is completed, for an LCU which is determined to enable Wiener filtering after the CTU decision, a first group of filter coefficients for Wiener filtering on the LCU reserved after the CTU decision are obtained, values of reference pixels at one or more reference pixel positions with a filter coefficient of a value 0 are set to 0, and a second group of filter coefficients are calculated based on updated values of the reference pixels; and a next CTU decision is made according to the second group of filter coefficients to determine whether each LCU of the current picture enables Wiener filtering.

As an example, considering that the relationship between reference pixels at some positions and a pixel to be filtered is not so close, or there may be a collinearity of the reference pixels, resulting in coefficients obtained from the training being not optimal. Therefore, in order to optimize the training effect of filter coefficients, after every CTU decision, for an LCU which is determined to enable Wiener filtering based on this CTU decision, based on the filter coefficients (referred to as the first group of filter coefficients herein) for Wiener filtering on the LCU reserved after this CTU decision, the encoding device can set values of reference pixels at one or more reference pixel positions with a filter coefficient of a value 0 to 0, and values of reference pixels at one or more reference pixel positions with the filter coefficient of a non-zero value are unchanged. The values of the reference pixels are updated, and new filter coefficients (referred to as the second group of filter coefficients herein) are calculated based on the updated values of the reference pixels.

When the second group of filter coefficients are obtained, the next CTU decision can be made according to the second group of filter coefficients to determine whether each LCU of the current picture enables Wiener filtering.

It should be noted that in the embodiment of the present disclosure, every time the second group of filter coefficients are calculated, the rate-distortion cost of filtering the current picture based on the first group of filter coefficients can also be compared with the rate-distortion cost of filtering the current picture based on the second group of filter coefficients. If the former is smaller, the first group of filter coefficients will be reserved; otherwise, the second group of filter coefficients will be reserved.

In addition, when the second group of filter coefficients are reserved, the encoding device can also update a result of region merging based on the updated filter coefficients, and the specific implementation will not be described herein.

In order to enable those skilled in the art to better understand the technical solution provided by the embodiments of the present disclosure, the technical solution provided by the embodiments of the present disclosure is described below in combination with specific examples.

In view of the shortcomings of traditional ALF technology, the present disclosure proposes a method to increase the number of filter coefficients in each group on the basis of traditional ALF parameters; or, keep the number of filter coefficients in each group unchanged and increase the number of the groups of filter coefficients. According to RDO decision, whether more groups of filter coefficients need to be added finally is controlled.

Main improvement points of the present disclosure will be described below from an encoding end and a decoding end respectively.

1. Encoding Method and Encoding Device 1.1 Changing a Filter Shape

As shown in FIG. 7, an encoding method for increasing filter coefficients is to amplify a filter shape of a 7*7 cross plus a 3*3 square (as shown in FIG. 5) based on reference pixel positions shown in FIG. 8 to obtain a filter shape of a 7*7 cross plus a 5*5 square. Six filter coefficients are added to the traditional filter coefficients.

1.2 Adding a Filtering Process

A group of filtering parameters are trained on the basis of traditional ALF technology in this solution.

The process of training the second group of filtering parameters is consistent with the traditional ALF technology, but there are the following differences:

1.2.1 The method of region division for pixels can include:
1.2.1.1 the manner same as the manner of the region division shown in FIG. 2 and the region merging shown in FIG. 3;
1.2.1.2 the manner different from the manner of the region division shown in FIG. 2 and the region merging shown in FIG. 3 (for example, subdividing into multiple regions on the basis of the region division shown in FIG. 2).
1.2.2 The filter shape can keep the filter shape shown in FIG. 5 (unchanged), or use other filter shapes (for example, the filter shape shown in FIG. 7).
1.2.3 The selection of reference pixels of the second filtering is different from the selection of reference pixels of the first filtering in the traditional solution.
1.2.3.1 The reference pixels of the second filtering are composed of absolute values of differences between pixel values at reference pixel positions and a pixel value at a central position in a reconstructed picture, and the reconstructed picture refers to a reconstructed picture before the first filtering (i.e., a first reconstructed picture).
1.2.3.2 The reference pixels of the second filtering are composed of absolute values of differences between reference pixel values and a central value in a reconstructed picture, and the reconstructed picture refers to a reconstructed picture after the first filtering (i.e., a second reconstructed picture).
1.2.3.3 The reference pixels of the second filtering are selected in the same manner as the reference pixels of the first filtering, but a reference pixel $P_1$ of the second filtering is obtained from the reconstructed picture after the first filtering (i.e., the second reconstructed picture).

It should be noted that 1.2.3.1, 1.2.3.2 and 1.2.3.3 are all improvements on the calculating method and obtaining method for reference pixels, and are mutually exclusive. 1.2.1 and 1.2.2 are independent of (1.2.3.1, 1.2.3.2 and 1.2.3.3) and can be combined with each other.

1.3 Adding One CTU Decision at an Encoding End

Before each CTU decision, a group of filter coefficients can be calculated, which can reflect a weight of each reference pixel position. Some reference positions with a filter coefficient of a value 0 can be considered as having weak correlation with a target value. When calculating the filter coefficients, many positions with strong correlation are reserved as possible, and some positions with weak correlation or even no correlation are deleted, so that the filtering effect will be better.

Therefore, after the last CTU decision, one CTU decision is added. When the last CTU decision is completed, for currently reserved filter coefficients, if a filter coefficient is 0, the value of the reference pixel at the current position is denoted as 0; if a filter coefficient is not 0, the value of the reference pixel at the position remains unchanged, and the last group of filter coefficients are trained to realize the update of filter coefficients.

Rate-distortion costs of the last two groups of filter coefficients (filter coefficients before and after updating) are calculated, the filter coefficients with a smaller rate-distortion cost are reserved and encoded.

1.4 Improvement of Calculating Filter Coefficients at an Encoding End

In this solution, if it is necessary to recalculate filter coefficients, every CTU decision is completed, for example, for one or more positions with a filter coefficient of a value 0 in filter coefficients reserved last time, reference pixels of the positions will not participate in filtering calculation, and values of the reference pixels will be directly set to 0.

It should be noted that for the encoding device, the improvements described in 1.1 (changing the filter shape), 1.2 (adding a filtering process), 1.3 (adding one CTU decision at the encoding end), and 1.4 (improvement of calculating filter coefficients at an encoding end) can be adopted independently or in combination with two or more.

For example, on the basis of adding a filtering process, a new filter shape is adopted in the first filtering process or/and the second filtering process; or, on the basis of adding one CTU decision, after one or more LCUs which enable wiener filtering are determined through CTU decisions, Wiener filtering can be carried out twice for the LCUs which enable Wiener filtering, and a new filter shape can be adopted in the first Wiener filtering or/and the second Wiener filtering.

2. Decoding Method and Decoding Device 2.1 Changing a Filter Shape

As shown in FIG. 7, an encoding method for increasing filter coefficients is to amplify a filter shape of a 7*7 cross plus a 3*3 square (as shown in FIG. 5) based on reference pixel positions shown in FIG. 8 to obtain a filter shape of a 7*7 cross plus a 5*5 square. Six filter coefficients are added to the traditional filter coefficients.

2.2 Adding a Filtering Process

The improvement of ALF decoding process corresponds to the above encoding process. If reference pixels of the first filtering and the second filtering are determined by a reconstructed picture before the first filtering (i.e., a first reconstructed picture), the second filtering can be performed in parallel with the first filtering. If the reference pixels of the second filtering are determined by a reconstructed picture after the first filtering (i.e., a second reconstructed picture), the second filtering needs to be performed after the first filtering.

2.2.1. The region division of the second filtering can be the same as or different from that of the first filtering, and needs to be consistent with the encoding end.
2.2.2 The filter shape of the second filtering can be the same as or different from that of the first filtering, and needs to be consistent with the encoding end.
2.2.3. If the reference pixels of the second filtering at the encoding end are determined by the reconstructed picture before the first filtering (i.e., the first reconstructed picture), and values of the reference pixels of the second filtering are obtained from the first reconstructed picture in a second manner, then the reference pixels of the second filtering and the first filtering are determined by the same reconstructed picture. For a same LCU, two groups of filter coefficients are obtained, filtering processes are performed in parallel, and filtering results are superposed.
2.2.4 If the reference pixels of the second filtering at the encoding end are determined by the reconstructed picture after the first filtering (i.e., the second reconstructed picture), the reference pixels of the second filtering and the first filtering are determined by different reconstructed pictures, and the values of the reference pixels of the second filtering are obtained from the second reconstructed picture in the second manner. The reference pixels of the second filtering need to be obtained after the first filtering is completed. The two filtering processes are carried out successively for a same LCU, and filtering results are superposed.

2.2.5 If the first filtering and the second filtering at the encoding end respectively adopt a first manner to obtain values of the reference pixels from the first reconstructed picture and the second reconstructed picture, the reference pixels of the second filtering need to be obtained after the first filtering is completed. For a same LCU, the two filtering processes are carried out successively.

It should be noted that for the decoding device, the improvements described in 2.1 (i.e. changing the filter shape) and 2.2 (adding a filtering process) can be adopted independently or in combination with two or more.

In addition, the encoding device and the decoding device should be consistent for the adoption of the above improvements.

Some implementations of each improvement point adopted independently or in combination will be exemplarily described below in combination with embodiments.

Embodiment 4

The filter shape is changed, and the encoding process at an encoding end remains unchanged: region division→obtaining reference pixels→region merging and calculating filter coefficients→determining whether each LCU enables filtering through a CTU decision.

The parameters that need to be calculated include: 1) a number of filtering parameters (unchanged); 2) region merge flag (unchanged); 3) each group of filter coefficients (each group of coefficients has been changed from 9 to 15); 4) whether to enable a filter flag for LCU (unchanged); 5) whether to enable a filter flag for a current component (Y, U, V) (unchanged).

Figure 11:
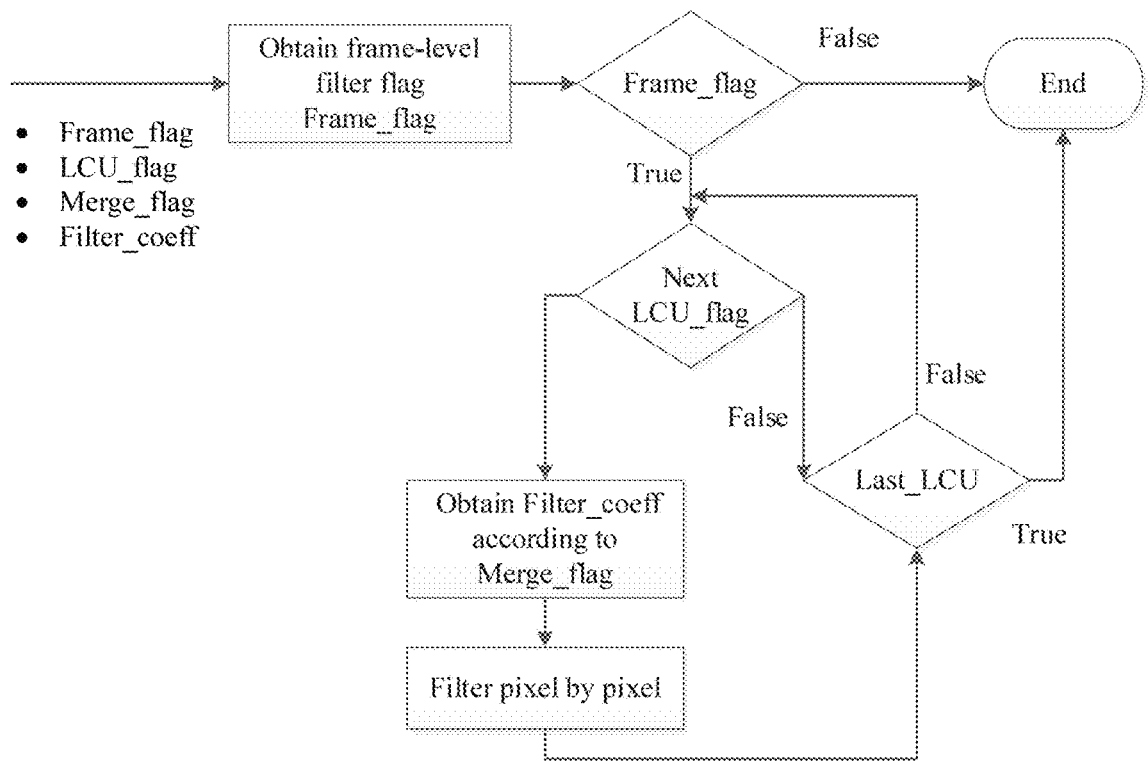
FIG. 11 is a schematic diagram illustrating a decoding process according to an exemplary embodiment of the present disclosure.

A decoding end obtains a bit stream, and the filter coefficients change from 9 to 15. The ALF decoding process at the decoding end is as follows: a filter flag of a current picture (i.e., Frame_flag) is obtained; if the picture should be filtered (i.e. the value of Frame_flag is true, and if the value of Frame_flag is false, no filtering is performed), then an LCU being taken as a minimum unit, whether to require ALF is determined through a filter flag of a current LCU (i.e., LCU_flag). If ALF is required, filter coefficients (Filter_coeff) for the current LCU are obtained. There are 15 filter coefficients in each group. The filter coefficients are used to filter all pixels in the LCU according to the filter shape in FIG. 7. The decoding filtering process is shown in FIG. 11.

As an example, an encoding device can determine whether each LCU in the current picture enables Wiener filtering through one or more CTU decisions, determine the value of the LCU_flag corresponding to each LCU based on the final result, and carry the value of the LCU_flag in an encoded bit stream to inform the decoding device. The decoding device determines whether to perform Wiener filtering on the corresponding LCU based on the value of the LCU_flag corresponding to each LCU.

Embodiment 5

A filtering process is added, which adopts a same manner of region division as the first ALF, and adopts a same filter shape as the first ALF, but the selection of reference pixels of the second filtering is different from that of the first filtering in the original solution. The reference pixels of the second filtering are composed of absolute values of differences between pixel values at reference pixel positions and a pixel value at a central position in a reconstructed picture, and the reconstructed picture refers to a reconstructed picture before the first filtering (i.e., a first reconstructed picture).

The filter shape is the filter shape described in FIG. 5, and the reference pixel at each position is shown in FIG. 4:

$E[i]=abs(P_i-P_8)+abs(P_{16-i}-P_8)$, $E[8]=1$, where $P_i$ represents a pixel value of the first reconstructed picture, $E[i]$ represents a value of a reference pixel, i=0, 1, 2, 3, 4, 5, 6, 7.

The goal of the second filtering is the linear combination for the values of the reference pixels so that a result obtained by the linear combination approaches a difference between values of a pixel of the original picture and the corresponding pixel after the first filtering.

Figure 12:
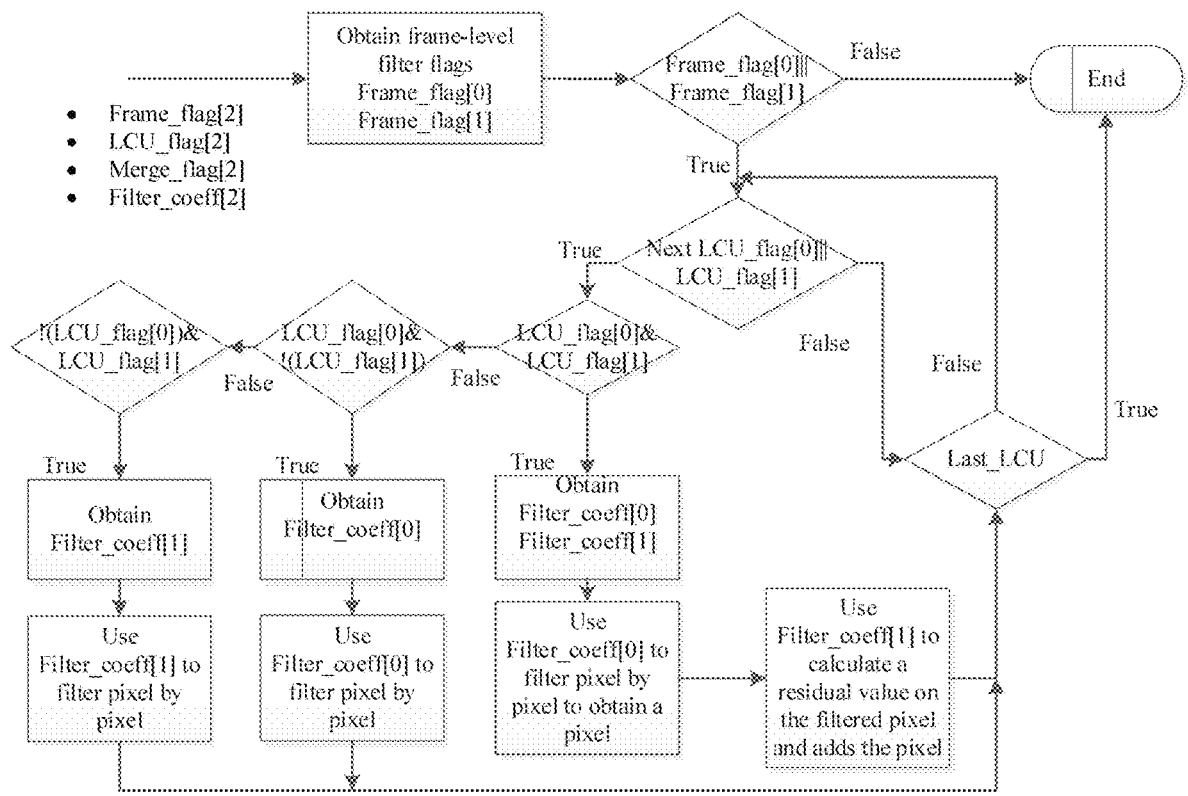
FIG. 12 is a schematic diagram illustrating a decoding process of two-time filtering according to an exemplary embodiment of the present disclosure.

The specific implementation process at the decoding end includes: filter flags for two filtering on the current picture (including a filter flag Frame_flag[0] for the first filtering and a filter flag Frame_flag[1] for the second filtering) are obtained; if one of the filter flags is true, an LCU being taken as a minimum unit, whether there is a filter flag with a value of true in two sets of filter flags for a current LCU (including a filter flag LCU_flag[0] for the first filtering and a filter flag LCU_flag[1] for the second filtering) is determined. If yes, the decoding end obtains filter coefficients (Filter_coeff[0] for the first filtering or/and Filter_coeff[1] for the second filtering) corresponding to one or more filter flags that are determined to be true in the two sets of filter flags, and perform filtering on all pixels in the LCU one by one, as shown in FIG. 12. Since only same pixels need to be read for reference pixels of the two filtering, the two filtering can be performed in parallel at the decoding end.

Embodiment 6

A filtering process is added, the second ALF adopts a manner of region division different from the first ALF, where two filtering for a same LCU can be in different regions, and the second ALF adopts a same filter shape as the first ALF, but the selection of reference pixels of the second ALF is different from that of the first filtering in the original solution. The reference pixels of the second ALF are composed of absolute values of differences between pixel values at reference pixel positions and a pixel value at a central position in a reconstructed picture, and the reconstructed picture refers to a reconstructed picture before the first filtering (i.e., a first reconstructed picture).

The filter shape is the filter shape described in FIG. 5, and the reference pixel at each position is shown in FIG. 4:

$E[i]=abs(P_i-P_8)+abs(P_{16-i}-P_8)$ $E[8]=1$ where $P_i$ represents a pixel value of the first reconstructed picture, $E[i]$ represents a value of a reference pixel, i=0, 1, 2, 3, 4, 5, 6, 7.

The goal of the second ALF is the linear combination for the values of the reference pixels so that a result obtained by the linear combination approaches a difference between values of a pixel of the original picture and the corresponding pixel after the first ALF.

The specific implementation process at the decoding end includes: filter flags for two filtering on the current picture are obtained; if one of the filter flags is true, an LCU being taken as a minimum unit, whether there is a filter flag with a value of true in two sets of filter flags for a current LCU is determined. If yes, the decoding end obtains filter coefficients corresponding to one or more filter flags that are determined to be true in the two sets of filter flags, and perform filtering on all pixels in the LCU one by one, as shown in FIG. 12. Since only same pixels need to be read for reference pixels of the two filtering, the two filtering can be performed in parallel at the decoding end.

As an example, an encoding device needs to respectively determine whether each LCU in the current picture enables the first Wiener filtering and the second Wiener filtering through one or more CTU decisions, determine values of LCU_flag[0] and LCU_flag[1] corresponding to each LCU based on the final determination result, and carry the values of the LCU_flag[0] and LCU_flag[1] in an encoded bit stream to inform the decoding device. The decoding device determines whether to enable the first Wiener filtering for the corresponding LCU and whether to enable the second Wiener filtering for the corresponding LCU based on the values of the LCU_flag[0] and LCU_flag[1] corresponding to each LCU.

Embodiment 7

A filtering process is added, which adopts the same manner of region division as the first ALF, but adopts a different filter shape from the first ALF. The reference pixels of the second ALF are composed of absolute values of differences between pixel values at reference pixel positions and a pixel value at a central position in a reconstructed picture, and the reconstructed picture refers to a reconstructed picture before the first ALF (i.e., a first reconstructed picture).

The filter shape is the filter shape described in FIG. 7, and the reference pixel at each position is shown in FIG. 8:

$$E[i]=abs(P_i-P_{14})+abs(P_{28-1}-P_{14})$$

$$E[14]=1$$

where $P_i$ represents a pixel value of the first reconstructed picture, $E[i]$ represents a value of a reference pixel, i=0, 1, 2, 3, 4, 5, 6, 7, 8, 9, 10, 11, 12, 13.

The goal of the second ALF is the linear combination for the values of the reference pixels so that a result obtained by the linear combination approaches a difference between values of a pixel of the original picture and the corresponding pixel after the first ALF.

The specific implementation process at the decoding end includes: filter flags for two filtering on the current picture are obtained; if one of the filter flags is true, an LCU being taken as a minimum unit, whether there is a filter flag with a value of true in two sets of filter flags for a current LCU is determined. If yes, the decoding end obtains filter coefficients corresponding to one or more filter flags that are determined to be true in the two sets of filter flags, and perform filtering on all pixels in the LCU one by one, as shown in FIG. 12. Since only same pixels need to be read for reference pixels of the two filtering, the two filtering can be performed in parallel at the decoding end.

Embodiment 8

A filtering process is added, which adopts a different manner of region division from the first ALF, and adopts a different filter shape from the first ALF. The reference pixels of the second ALF are composed of absolute values of differences between pixel values at reference pixel positions and a pixel value at a central position in a reconstructed picture, and the reconstructed picture refers to a reconstructed picture before the first ALF (i.e., a first reconstructed picture).

The filter shape is the filter shape described in FIG. 7, and the reference pixel at each position is shown in FIG. 8:

$$E[i]=abs(P_i-P_{14})+abs(P_{28-1}-P_{14})$$

$$E[14]=1$$

where $P_i$ represents a pixel value of the first reconstructed picture, $E[i]$ represents a value of a reference pixel, i=0, 1, 2, 3, 4, 5, 6, 7, 8, 9, 10, 11, 12, 13.

The goal of the second ALF is the linear combination for the values of the reference pixels so that a result obtained by the linear combination approaches a difference between values of a pixel of the original picture and the corresponding pixel after the first ALF.

The specific implementation process at the decoding end includes: filter flags for two filtering on the current picture are obtained; if one of the filter flags is true, an LCU being taken as a minimum unit, whether there is a filter flag with a value of true in two sets of filter flags for a current LCU is determined. If yes, the decoding end obtains filter coefficients corresponding to one or more filter flags that are determined to be true in the two sets of filter flags, and perform filtering on all pixels in the LCU one by one, as shown in FIG. 12. Since only same pixels need to be read for reference pixels of the two filtering, the two filtering can be performed in parallel at the decoding end.

Embodiment 9

A filtering process is added, which adopts a same manner of region division as the first ALF, and adopts a same filter shape as the first ALF, but the selection of reference pixels of the second ALF is different from that of the first ALF in the original solution. The reference pixels of the second ALF are composed of absolute values of differences between pixel values at reference pixel positions and a pixel value at a central position in a reconstructed picture, and the reconstructed picture refers to a reconstructed picture after the first ALF (i.e., a second reconstructed picture).

The filter shape is the filter shape described in FIG. 5, and the reference pixel at each position is shown in FIG. 4:

$$E[i]=abs(P_i-P_8)+abs(P_{16-1}-P_8)$$

$$E[8]=1$$

where $P_i$ represents a pixel value of the second reconstructed picture, $E[i]$ represents a value of a reference pixel, i=0, 1, 2, 3, 4, 5, 6, 7.

The goal of the second ALF is the linear combination for the values of the reference pixels so that a result obtained by the linear combination approaches a difference between values of a pixel of the original picture and the corresponding pixel after the first ALF.

The specific implementation process at the decoding end includes: filter flags for two filtering on the current picture are obtained; if one of the filter flags is true, an LCU being taken as a minimum unit, whether there is a filter flag with a value of true in two sets of filter flags for a current LCU is determined. If yes, the decoding end obtains filter coefficients corresponding to one or more filter flags that are determined to be true in the two sets of filter flags, and perform filtering on all pixels in the LCU one by one, as shown in FIG. 12.

Embodiment 10

A filtering process is added, which adopts a different manner of region division as the first ALF, and adopts a same filter shape as the first ALF, but the selection of reference pixels of the second ALF is different from that of the first ALF in the original solution. The reference pixels of the second ALF are composed of absolute values of differences between pixel values at reference pixel positions and a pixel value at a central position in a reconstructed picture, and the reconstructed picture refers to a reconstructed picture after the first ALF (i.e., a second reconstructed picture).

The filter shape is the filter shape described in FIG. 5, and the reference pixel at each position is shown in FIG. 4:

$$E[i]=\text{abs}(P_i-P_8)+\text{abs}(P_{16-1}-P_8)$$

$$E[8]=1$$

where $P_1$ represents a pixel value of the second reconstructed picture, E[i] represents a value of a reference pixel, i=0, 1, 2, 3, 4, 5, 6, 7.

The goal of the second ALF is the linear combination for the values of the reference pixels so that a result obtained by the linear combination approaches a difference between values of a pixel of the original picture and the corresponding pixel after the first ALF.

The specific implementation process at the decoding end includes: filter flags for two filtering on the current picture are obtained; if one of the filter flags is true, an LCU being taken as a minimum unit, whether there is a filter flag with a value of true in two sets of filter flags for a current LCU is determined. If yes, the decoding end obtains filter coefficients corresponding to one or more filter flags that are determined to be true in the two sets of filter flags, and perform filtering on all pixels in the LCU one by one, as shown in FIG. 12.

Embodiment 11

A filtering process is added, which adopts a same manner of region division as the first ALF, but adopts a different filter shape from the first ALF. The reference pixels of the second ALF are composed of absolute values of differences between pixel values at reference pixel positions and a pixel value at a central position in a reconstructed picture, and the reconstructed picture refers to a reconstructed picture after the first ALF (i.e., a second reconstructed picture).

The filter shape is the filter shape described in FIG. 7, and the reference pixel at each position is shown in FIG. 8:

$$E[i]=\text{abs}(P_1-P_{14})+\text{abs}(P_{28-1}-P_{14})$$

$$E[14]=1$$

where $P_1$ represents a pixel value of the second reconstructed picture, E[i] represents a value of a reference pixel, i=0, 1, 2, 3, 4, 5, 6, 7, 8, 9, 10, 11, 12, 13.

The goal of the second ALF is the linear combination for the values of the reference pixels so that a result obtained by the linear combination approaches a difference between values of a pixel of the original picture and the corresponding pixel after the first ALF.

The specific implementation process at the decoding end includes: filter flags for two filtering on the current picture are obtained; if one of the filter flags is true, an LCU being taken as a minimum unit, whether there is a filter flag with a value of true in two sets of filter flags for a current LCU is determined. If yes, the decoding end obtains filter coefficients corresponding to one or more filter flags that are determined to be true in the two sets of filter flags, and perform filtering on all pixels in the LCU one by one, as shown in FIG. 12.

Embodiment 12

A filtering process is added, which adopts a different manner of region division as the first ALF, and adopts a different filter shape from the first ALF. The reference pixels of the second ALF are composed of absolute values of differences between pixel values at reference pixel positions and a pixel value at a central position in a reconstructed picture, and the reconstructed picture refers to a reconstructed picture after the first ALF (i.e., a second reconstructed picture).

The filter shape is the filter shape described in FIG. 7, and the reference pixel at each position is shown in FIG. 8:

$$E[i]=\text{abs}(P_i-P_{14})+\text{abs}(P_{28-i}-P_{14})$$

$$E[14]=1$$

where $P_i$ represents a pixel value of the second reconstructed picture, E[i] represents a value of a reference pixel, i=0, 1, 2, 3, 4, 5, 6, 7, 8, 9, 10, 11, 12, 13.

The specific implementation process at the decoding end includes: filter flags for two filtering on the current picture are obtained; if one of the filter flags is true, an LCU being taken as a minimum unit, whether there is a filter flag with a value of true in two sets of filter flags for a current LCU is determined. If yes, the decoding end obtains filter coefficients corresponding to one or more filter flags that are determined to be true in the two sets of filter flags, and perform filtering on all pixels in the LCU one by one, as shown in FIG. 12.

Embodiment 13

A filtering process is added, which adopts a same manner of region division as the first ALF, adopts a same filter shape as the first ALF, and the selection of reference pixels of the second ALF is the same as that of the first ALF in the original solution. The values of reference pixels of the second ALF are determined by a reconstructed picture after the first ALF (i.e., a second reconstructed picture).

The filter shape is the filter shape described in FIG. 5, and the reference pixel at each position is shown in FIG. 4:

$$E[i]=(P_i+P_{16-i})$$

$$E[8]=P_8$$

where $P_i$ represents a pixel value of the second reconstructed picture, E[i] represents a value of a reference pixel, i=0, 1, 2, 3, 4, 5, 6, 7.

The goal of the second Wiener filtering is the linear combination for the values of the reference pixels so that a result obtained by the linear combination approaches a pixel value of the original picture.

The specific implementation process at the decoding end includes: filter flags for two filtering on the current picture are obtained; if one of the filter flags is true, an LCU being taken as a minimum unit, whether there is a filter flag with a value of true in two sets of filter flags for a current LCU is determined. If yes, the decoding end obtains filter coefficients corresponding to one or more filter flags that are determined to be true in the two sets of filter flags, and perform filtering on all pixels in the LCU one by one, as shown in FIG. 12.

Embodiment 14

A filtering process is added, which adopts a different manner of region division from the first ALF, adopts a same filter shape as the first ALF, and the selection of reference pixels of the second ALF is the same as that of the first ALF in the original solution. The values of reference pixels of the second ALF are determined by a reconstructed picture after the first ALF (i.e., a second reconstructed picture).

The filter shape is the filter shape described in FIG. 5, and the reference pixel at each position is shown in FIG. 4:

$E[i]=(P_i+P_{16-i})$ $E[8]=P_8$ where $P_i$ represents a pixel value of the second reconstructed picture, E[i] represents a value of a reference pixel, i=0, 1, 2, 3, 4, 5, 6, 7.

The goal of the second Wiener filtering is the linear combination for the values of the reference pixels so that a result obtained by the linear combination approaches a pixel value of the original picture.

The specific implementation process at the decoding end includes: filter flags for two filtering on the current picture are obtained; if one of the filter flags is true, an LCU being taken as a minimum unit, whether there is a filter flag with a value of true in two sets of filter flags for a current LCU is determined. If yes, the decoding end obtains filter coefficients corresponding to one or more filter flags that are determined to be true in the two sets of filter flags, and perform filtering on all pixels in the LCU one by one, as shown in FIG. 12.

Embodiment 15

A filtering process is added, which adopts a same manner of region division as the first ALF, adopts a different filter shape from the first ALF, and the selection of reference pixels of the second ALF is the same as that of the first ALF in the original solution. The values of reference pixels of the second ALF are determined by a reconstructed picture after the first ALF (i.e., a second reconstructed picture).

The filter shape is the filter shape described in FIG. 7, and the reference pixel at each position is shown in FIG. 8:

$E[i]=P_i+P_{28-i}$ $E[14]=P_{14}$ where $P_i$ represents a pixel value of the second reconstructed picture, E[i] represents a value of a reference pixel, i=0, 1, 2, 3, 4, 5, 6, 7, 8, 9, 10, 11, 12, 13.

The goal of the second Wiener filtering is the linear combination for the values of the reference pixels so that a result obtained by the linear combination approaches a pixel value of the original picture.

The specific implementation process at the decoding end includes: filter flags for two filtering on the current picture are obtained; if one of the filter flags is true, an LCU being taken as a minimum unit, whether there is a filter flag with a value of true in two sets of filter flags for a current LCU is determined. If yes, the decoding end obtains filter coefficients corresponding to one or more filter flags that are determined to be true in the two sets of filter flags, and perform filtering on all pixels in the LCU one by one, as shown in FIG. 12.

Embodiment 16

A filtering process is added, which adopts a different manner of region division from the first ALF, adopts a different filter shape from the first ALF, and the selection of reference pixels of the second ALF is the same as that of the first ALF in the original solution. The values of reference pixels of the second ALF are determined by a reconstructed picture after the first ALF (i.e., a second reconstructed picture).

The filter shape is the filter shape described in FIG. 7, and the reference pixel at each position is shown in FIG. 8:

$E[i]=P_i+P_{28-i}$ $E[14]=P_{14}$ where $P_i$ represents a pixel value of the second reconstructed picture, E[i] represents a value of a reference pixel, i=0, 1, 2, 3, 4, 5, 6, 7, 8, 9, 10, 11, 12, 13.

The goal of the second Wiener filtering is the linear combination for the values of the reference pixels so that a result obtained by the linear combination approaches a pixel value of the original picture.

The specific implementation process at the decoding end includes: filter flags for two filtering on the current picture are obtained; if one of the filter flags is true, an LCU being taken as a minimum unit, whether there is a filter flag with a value of true in two sets of filter flags for a current LCU is determined. If yes, the decoding end obtains filter coefficients corresponding to one or more filter flags that are determined to be true in the two sets of filter flags, and perform filtering on all pixels in the LCU one by one, as shown in FIG. 12.

Embodiment 17

Figure 13:
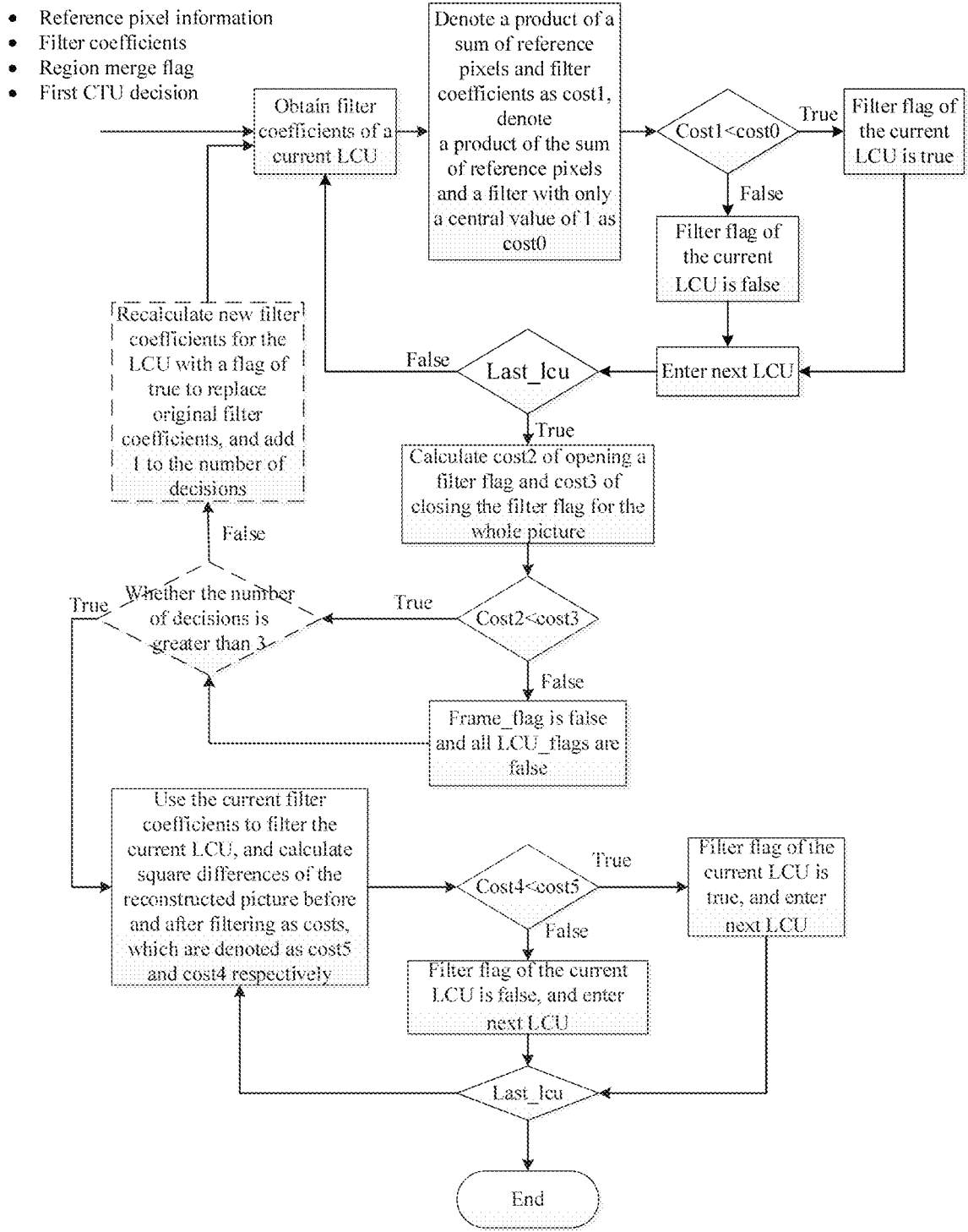
FIG. 13 is a schematic diagram illustrating a CTU decision process according to an exemplary embodiment of the present disclosure.

One CTU decision is added at the encoding end. In the traditional solution, a CTU decision process at the coding end is shown in FIG. 13. The number of CTU decisions is modified to 4. However, after a third CTU decision is completed, new filter coefficients are recalculated for one or more LCUs with a flag of true to replace original filter coefficients. When calculating the new filter coefficients, for one or more positions with a filter coefficient of a value 0 last time, values of reference pixels at the positions are set to 0 when calculating coefficients for the last time, That is, dotted boxes in FIG. 13 are modified.

As shown in FIG. 13, the CTU decision process can include:

When a first CTU decision is made, filter coefficients of a current LCU of a current picture can be obtained. On the one hand, for any pixel in the current LCU, a weighted sum can be obtained based on the filter coefficients and values of reference pixels at corresponding positions to obtain a weighted sum result corresponding to the pixel, then the weighted sum result of each pixel of the current LCU can be summed, and the result is denoted as cost1 (cost1 can be understood as an estimated cost of filtering the current LCU).

On the other hand, for any pixel in the current LCU, a filter with a central value of 1 and remaining values of 0 can be adopted, a weighted sum can be obtained based on the filter coefficients and values of reference pixels at corresponding positions to obtain a weighted sum result corresponding to the pixel, then the weighted sum result of each pixel of the current LCU can be summed, and the result is denoted as cost0 (cost0 can be understood as an estimated cost without filtering the current LCU).

If cost1<cost0, it is determined to enable Wiener filtering for the current LCU; otherwise, it is determined not to enable Wiener filtering for the current LCU.

According to the above manner, when it is determined whether each LCU in the current picture enables Wiener filtering, a cost (cost2) of opening a filter flag and a cost (cost3) of closing the filter flag can be calculated for the whole picture.

If cost2<cost3, it is determined to filter the current picture; otherwise, it is determined not to filter the current picture.

So far, one CTU decision has been completed.

When the number of completed CTU decisions is not greater than 3, based on the filter coefficients corresponding to an LCU that enables Wiener filtering, value of reference pixels at one or more reference pixel positions with a filter coefficient of a value 0 can be set to 0, and based on updated values of the reference pixels, new filter coefficients can be calculated to replace original filter coefficients, and a next CTU decision can be made based on the new filter coefficients.

When the number of completed CTU decisions is greater than 3 (i.e., 4), the current LCU can be filtered with current filter coefficients to obtain a cost (cost4), and cost4 can be compared with a cost (cost5) without filtering the current LCU.

If cost4<cost5, it is determined to enable Wiener filtering for the current LCU; otherwise, it is determined not to enable Wiener filtering for the current LCU.

Embodiment 18

After each CTU decision, it is necessary to recalculate new filter coefficients for LCUs with a flag of true to replace original filter coefficients. Therefore, every time new filter coefficients are calculated, for one or more positions with a filter coefficient of a value 0 last time, values of reference pixels at these positions will be set to 0 when coefficients are calculated next time.

Embodiment 19, Modification of Adaptive Leveling Filtering Operation

Samples for the filter with a shape of a 7×7 cross plus a 5×5 square can be obtained according to the adaptive leveling filtering operation described in 5.1-5.3, or obtained in the following manner.

For boundary region:

If a picture boundary is outside a left boundary of a current adaptive leveling filter unit, or is outside a patch boundary and the value of cross_patch_loop_filter_enable_flag is 0, then it is not present outside the left boundary, otherwise, outside the left boundary is the region where the current adaptive leveling filter unit moves 3 sample points left to the current adaptive leveling filter unit.

Similarly, if the picture boundary is outside a right boundary of the current adaptive leveling filter unit, or is outside the patch boundary, and the value of cross_patch_loop_filter_enable_flag is 0, then it is not present outside the right boundary, otherwise, outside the right boundary is the region where the current adaptive leveling filter unit moves 3 sample points left to the current adaptive leveling filter unit.

In an example, the boundary region includes the region outside the left boundary and the region outside the right boundary.

If a sample used in the adaptive leveling filtering process is a sample in the adaptive leveling filter unit, the sample is directly used for filtering; otherwise, filtering is performed as follows.

19.1 In the case where the sample is outside a boundary of the picture, or outside a patch boundary and the value of a cross patch boundary filter flag (cross_patch_loop_filter_enable_flag) is '0' (when cross_patch_loop_filter_enable_flag is '0', it indicates adaptive leveling filtering (Wiener filtering) should not be performed by crossing patch boundaries; when cross_patch_loop_filter_enable_flag is '1', it indicates adaptive leveling filtering can be performed by crossing patch boundaries), 19.1.1 if the sample is a first sample point in an upper left corner, a lower left corner, an upper right corner or a lower right corner outside of the adaptive leveling filter unit, a sample nearest to this sample in the adaptive leveling filter unit is used to replace the sample for filtering;

19.1.2 otherwise, a sample nearest to this sample in the adaptive leveling filter unit and the boundary region is used to replace the sample for filtering.

19.2 In the case where the sample is not outside a boundary of the picture and does not satisfy "the sample is outside a patch boundary and the value of cross_patch_loop_filter_enable_flag is '0'", if the sample is outside an upper boundary or outside a lower boundary of the adaptive leveling filter unit, 19.2.1 if the sample is a first sample point in an upper left corner, a lower left corner, an upper right corner or a lower right corner outside of the adaptive leveling filter unit, a sample nearest to this sample in the adaptive leveling filter unit is used to replace the sample for filtering;

19.2.2 otherwise, a sample nearest to this sample in the adaptive leveling filter unit and the boundary region is used to replace the sample for filtering;

19.3. If the sample is not outside the upper boundary of the adaptive leveling filter unit or outside the lower boundary of the adaptive leveling filter unit, the sample is directly used for filtering.

As an example, any one of Embodiments 1 to 18 can adopt the manner in Embodiment 19 for adaptive leveling filtering operation.

The methods provided in the present disclosure are described above. The apparatuses provided in the present disclosure will be described below.

Figure 15:
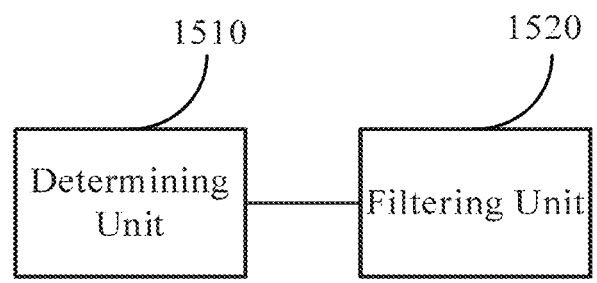
FIG. 15 is a schematic block diagram illustrating a filtering apparatus according to an exemplary embodiment of the present disclosure.

Please refer to FIG. 15, which is a schematic block diagram illustrating a filtering apparatus according to an exemplary embodiment of the present disclosure. The filtering apparatus can be applied to an encoding device or a decoding device, and can include a determining unit 1510 and a filtering unit 1520.

The filtering unit 1520 is configured to, when the determining unit 1510 determines to enable Wiener filtering for a current Largest Coding Unit (LCU) of a current picture, obtain reference pixels of the current LCU and filter coefficients of a Wiener filter, and perform the Wiener filtering on pixels of the current LCU one by one according to the reference pixels of the current LCU and the filter coefficients of the Wiener filter.

In an example, the Wiener filter is a second Wiener filter. The second Wiener filter is obtained by shape amplification on the basis of the first Wiener filter. The first Wiener filter is a centrosymmetric filter with a shape of a 7*7 cross plus a 3*3 square. Values of the reference pixels are determined based on pixel values of a reconstructed picture before the Wiener filtering.

In one possible implementation, the second Wiener filter is a centrosymmetric filter with a shape of a 7*7 cross plus a 5*5 square.

In one possible implementation, the second Wiener filter includes 15 filter coefficients.

In one possible implementation, the determining unit 1510 is configured to determine whether to filter the current picture;

the filtering unit 1520 is specifically configured to, determine whether to enable Wiener filtering for the current LCU when the determining unit 1510 determines to filter the current picture, and when determining to enable Wiener filtering for the current LCU, obtain reference pixels of the current LCU and filter coefficients of the Wiener filter, and perform the Wiener filtering on pixels of the current LCU one by one according to the reference pixels of the current LCU and the filter coefficients of the Wiener filter.

Figure 16:
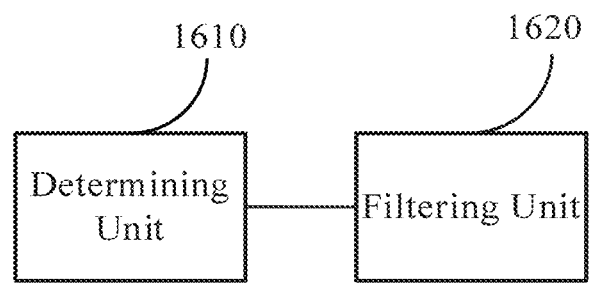
FIG. 16 is a schematic block diagram illustrating another filtering apparatus according to an exemplary embodiment of the present disclosure.

Please refer to FIG. 16, which is a schematic block diagram illustrating a filtering apparatus according to an exemplary embodiment of the present disclosure. The filtering apparatus can be applied to an encoding device or a decoding device, and can include a determining unit 1610 and a filtering unit 1620.

The filtering unit 1620 is configured, when the determining unit 1610 determines to enable Wiener filtering for a current Largest Coding Unit (LCU) of a current picture, perform the first Wiener filtering and the second Wiener filtering on the current LCU.

The filtering unit 1620 is specifically configured to, obtain Wiener filter coefficients of a Wiener filter and reference pixels for the first Wiener filtering on the current LCU, and Wiener filter coefficients and reference pixels for the second Wiener filtering on the current LCU, and according to the Wiener filter coefficients and the reference pixels for the first Wiener filtering, and the Wiener filter coefficients and the reference pixels for the second Wiener filtering, perform the first Wiener filtering and the second Wiener filtering on pixels of the current LCU one by one.

In one possible implementation, the determining unit 1610 is configured to determine whether to filter the current picture;

the filtering unit 1620 is specifically configured to, determine whether to enable Wiener filtering for the current LCU when the determining unit 1610 determines to filter the current picture, and perform the first Wiener filtering and the second Wiener filtering on the current LCU when determining to enable the Wiener filtering for the current LCU.

In one possible implementation, the determining unit 1610 is specifically configured to determine whether to perform a first filtering on the current picture and whether to perform a second filtering on the current picture;

the determining unit 1610 is further configured to, when determining to perform the first filtering on the current picture and whether to perform the second filtering on the current picture, determine whether to enable the first Wiener filtering for the current LCU and whether to enable the second Wiener filtering for the current LCU;

the filtering unit 1620 is specifically configured to perform the first Wiener filtering and the second Wiener filtering on the current LCU when the determining unit 1610 determines to enable the first Wiener filtering on the current LCU and enable the second Wiener filtering on the current LCU.

In one possible implementation, the Wiener filter that performs the first Wiener filtering on the current LCU and the Wiener filter that performs the second Wiener filtering on the current LCU are both a first Wiener filter; or, the Wiener filter that performs the first Wiener filtering on the current LCU and the Wiener filter that performs the second Wiener filtering on the current LCU are both a second Wiener filter; or, the Wiener filter that performs the first Wiener filtering on the current LCU is the first Wiener filter, and the Wiener filter that performs the second Wiener filtering on the current LCU is the second Wiener filter; or, the Wiener filter that performs the first Wiener filtering on the current LCU is the second Wiener filter, and the Wiener filter that performs the second Wiener filtering on the current LCU is the first Wiener filter.

The second Wiener filter is obtained by shape amplification on the basis of the first Wiener filter. The first Wiener filter is a centrosymmetric filter with a shape of a 7*7 cross plus a 3*3 square.

In one possible implementation, the second Wiener filter is a centrosymmetric filter with a shape of a 7*7 cross plus a 5*5 square.

In one possible implementation, values of the reference pixels for the first Wiener filtering on the current LCU are obtained from a first reconstructed picture in a first manner, and the first reconstructed picture is a reconstructed picture before the first Wiener filtering;

values of reference pixels for the second Wiener filtering on the current LCU are obtained from the first reconstructed picture in a second manner.

In one possible implementation, the second manner can be:

values of reference pixels corresponding to each pixel in the current LCU are determined based on absolute values of differences between pixel values at respective reference pixel positions and a pixel value at a central position in the first reconstructed picture.

In one possible implementation, the first Wiener filtering on the current LCU and the second Wiener filtering on the current LCU can be performed in parallel.

In one possible implementation, values of the reference pixels for the first Wiener filtering on the current LCU are determined based on pixel values of the first reconstructed picture, which is a reconstructed picture before the first Wiener filtering;

values of the reference pixels for the second Wiener filtering on the current LCU are determined based on pixel values of a second reconstructed picture, which is a reconstructed picture after the first Wiener filtering.

In one possible implementation, the values of the reference pixels for the second Wiener filtering on the current LCU are determined based on absolute values of differences between pixel values at respective reference pixel positions and a pixel value at a central position in the second reconstructed picture.

In one possible implementation, the filtering unit is further configured to perform region division on the current picture according to a position of the LCU in the current picture, LCUs belonging to one region being configured with same filtering parameters, and the filtering parameters including a filter for Wiener filtering and corresponding filter coefficients, as well as the reference pixels. Manners of region division include but are not limited to one manner.

In one possible implementation, when the filtering apparatus is applied to the encoding device, the determining unit 1610 is further configured to, when three CTU decisions are completed, for an LCU which is determined to enable Wiener filtering after the three CTU decisions, obtain a first group of filter coefficients for Wiener filtering on the LCU reserved after the three CTU decisions, set values of reference pixels at one or more reference pixel positions with a filter coefficient of a value 0 to 0, and calculate a second group of filter coefficients based on updated values of the reference pixels;

the determining unit 1610 is further configured to make a fourth CTU decision according to the second group of filter coefficients to determine whether each LCU of the current picture enables Wiener filtering.

In one possible implementation, when the filtering apparatus is applied to the encoding device, the determining unit 1610 is further configured to, every CTU decision is completed, for an LCU which is determined to enable Wiener filtering after the CTU decision, obtain a first group of filter coefficients for Wiener filtering on the LCU reserved after the CTU decision, set values of reference pixels at one or more reference pixel positions with a filter coefficient of a value 0 to 0, and calculate a second group of filter coefficients based on updated values of the reference pixels;

the determining unit 1610 is further configured to make a next CTU decision according to the second group of filter coefficients to determine whether each LCU of the current picture enables Wiener filtering.

Figure 17:
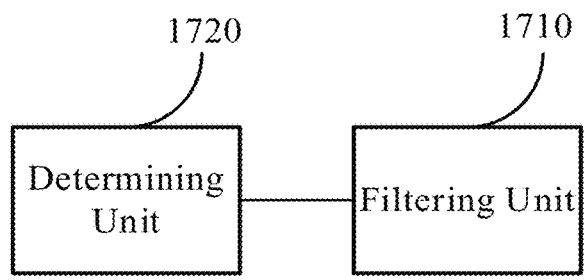
FIG. 17 is a schematic block diagram illustrating yet another filtering apparatus according to an exemplary embodiment of the present disclosure.

Please refer to FIG. 17, which is a schematic block diagram illustrating a filtering apparatus according to an exemplary embodiment of the present disclosure. The filtering apparatus can be applied to an encoding device, and can include a filtering unit 1710 and a determining unit 1720.

The filtering unit 1710 is configured to, when three CTU decisions are completed, for an LCU which is determined to enable Wiener filtering after the three CTU decisions, obtain a first group of filter coefficients for Wiener filtering on the LCU reserved after the three CTU decisions, set values of reference pixels at one or more reference pixel positions with a filter coefficient of a value 0 to 0, and calculate a second group of filter coefficients based on updated values of the reference pixels;

the determining unit 1720 is configured to make a fourth CTU decision according to the second group of filter coefficients to determine whether each LCU of the current picture enables Wiener filtering.

In a possible embodiment, the determining unit 1720 is further configured to, every CTU decision is completed, for an LCU which is determined to enable Wiener filtering after the CTU decision, obtain a first group of filter coefficients for Wiener filtering on the LCU reserved after the CTU decision, set values of reference pixels at one or more reference pixel positions with a filter coefficient of a value 0 to 0, and calculate a second group of filter coefficients based on updated values of the reference pixels;

the determining unit 1720 is further configured to make a next CTU decision according to the second group of filter coefficients to determine whether each LCU of the current picture enables Wiener filtering.

In a possible embodiment, the filtering unit 1710 is further configured to, when the determining unit 1720 determines to enable Wiener filtering for the current LCU of the current picture, obtain reference pixels of the current LCU and filter coefficients of a Wiener filter, and perform the Wiener filtering on pixels of the current LCU one by one according to the reference pixels of the current LCU and the filter coefficients of the Wiener filter;

The Wiener filter is a second Wiener filter. The second Wiener filter is obtained by shape amplification on the basis of the first Wiener filter. The first Wiener filter is a centrosymmetric filter with a shape of a 7*7 cross plus a 3*3 square. Values of the reference pixels are determined based on pixel values of a reconstructed picture before the Wiener filtering. The second Wiener filter is a centrosymmetric filter with a shape of a 7*7 cross plus a 5*5 square.

Figure 18:
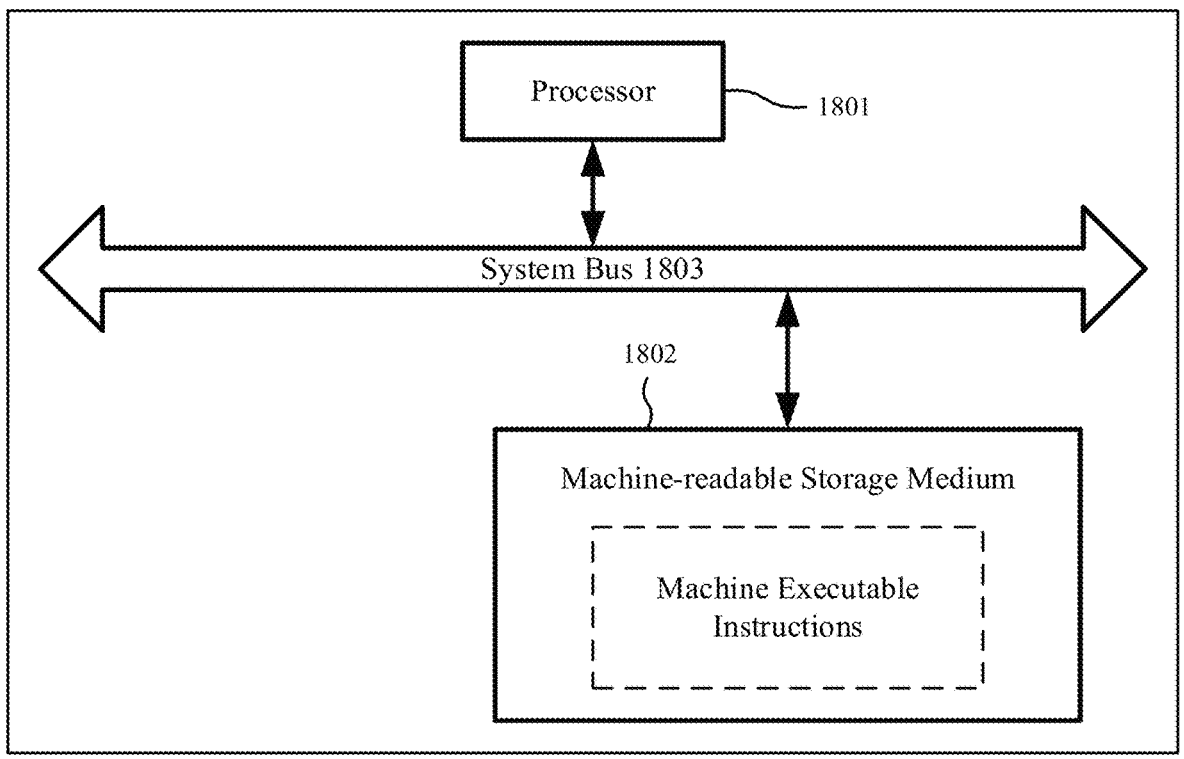
FIG. 18 is a schematic structural diagram illustrating a decoding device according to an exemplary embodiment of the present disclosure.

Please refer to FIG. 18, which is a schematic hardware structure diagram illustrating a decoding device according to an exemplary embodiment of the present disclosure. The decoding device may include a processor 1801 and a machine-readable storage medium 1802 storing machine executable instructions. The processor 1801 and the machine-readable storage medium 1802 may communicate via a system bus 1803. Furthermore, by reading and executing machine executable instructions corresponding to the filtering control logic in the machine-readable storage medium 1802, the processor 1801 may perform the filtering method at the decoding device described above.

The machine-readable storage medium 1802 referred to herein may be any electronic, magnetic, optical or other physical storage device, and may contain or store information, such as executable instructions, data, and the like. For example, the machine-readable storage medium can be a RAM (Radom Access Memory), a volatile memory, a non-volatile memory, a flash memory, a storage drive (such as hard disk drive), a solid state disk, any type of storage disk (such as optical disk, dvd, etc.), or a similar storage medium, or a combination thereof.

In some embodiments, there is also provided a machine-readable storage medium having stored thereon machine executable instructions. When the machine executable instructions are executed by a processor, the filtering method at the decoding device described above is implemented. For example, the machine-readable storage medium can be a ROM, a RAM, a CD-ROM, a tape, a floppy disk, an optical data storage device, etc.

Figure 19:
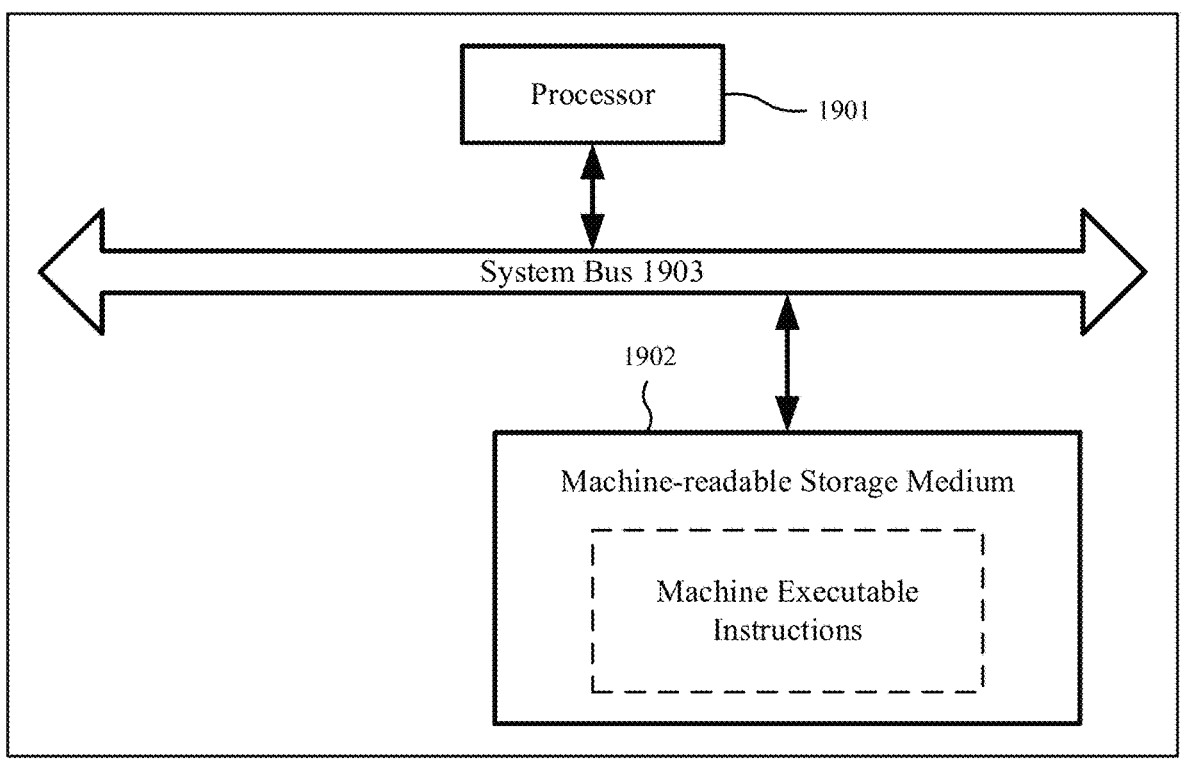
FIG. 19 is a schematic structural diagram illustrating an encoding device according to an exemplary embodiment of the present disclosure.

Please refer to FIG. 19, which is a schematic hardware structure diagram illustrating an encoding device according to an exemplary embodiment of the present disclosure. The encoding device may include a processor 1901 and a machine-readable storage medium 1902 storing machine executable instructions. The processor 1901 and the machine-readable storage medium 1902 may communicate via a system bus 1903. Furthermore, by reading and executing machine executable instructions corresponding to the filtering control logic in the machine-readable storage medium 1902, the processor 1901 may perform the filtering method at the encoding device described above.

The machine-readable storage medium 1902 referred to herein may be any electronic, magnetic, optical or other physical storage device, and may contain or store information, such as executable instructions, data, and the like. For example, the machine-readable storage medium can be a RAM (Radom Access Memory), a volatile memory, a non-volatile memory, a flash memory, a storage drives (such as hard disk drive), a solid state disk, any type of storage disk (such as optical disk, dvd, etc.), or a similar storage media, or a combination thereof.

In some embodiments, there is also provided a machine-readable storage medium having stored thereon machine executable instructions. When the machine executable instructions are executed by a processor, the filtering method at the encoding device described above is implemented. For example, the machine-readable storage medium can be a ROM, a RAM, a CD-ROM, a tape, a floppy disk, an optical data storage device, etc.

In some embodiments, there is also provided a camera device including a filtering apparatus in any of the above embodiments.

It should be noted that, relational terms such as first and second, and the like in the text are only used to distinguish one entity or action from another entity or action without necessarily requiring or implying any actual relationship or order between such entities or actions. Moreover, the terms "comprises", "includes", or any other variation thereof, are intended to cover a non-exclusive inclusion, such that a process, method, article, or device that includes a list of elements does not include only those elements but may include other elements not expressly listed or may include elements that inherent to such process, method, article, or device. Without further limitation, an element defined by the phrase "comprising an . . . " does not exclude the presence of other identical elements in the process, method, article, or apparatus that comprises the element.

The above is only the preferred embodiment of the present disclosure and are not intended to limit the present application, and any modifications, equivalents, improvements and the like made within the spirit and principle of the present application should be included in the protection scope of the present application.

The invention claimed is:

1. A filtering method, performed by an encoding device or a decoding device, the filtering method comprises:
   determining to enable Wiener filtering for an adaptive leveling filter unit of a current picture,
     deriving the adaptive leveling filter unit from a current Largest Coding Unit (LCU) of the current picture;
     obtaining reference pixels of the adaptive leveling filter unit and filter coefficients of a Wiener filter; and
     according to the reference pixels and the filter coefficients of the Wiener filter, performing the Wiener filtering based on sample pixels of the adaptive leveling filter unit;
   wherein the Wiener filter is a centrosymmetric filter with a shape of a 7*7 cross plus a 5*5 square, and values of the reference pixels are derived from pixel values of a reconstructed picture before the Wiener filtering;
   wherein according to the reference pixels and the filter coefficients of the Wiener filter, performing the Wiener filtering based on the sample pixels of the adaptive leveling filter unit, comprises:
   if a sample used in an adaptive leveling filtering process is a sample in the adaptive leveling filter unit, using the sample used in the adaptive leveling filtering process for filtering;
   if a sample used in the adaptive leveling filtering process is not a sample in the adaptive leveling filter unit,
     in the case where the sample used in the adaptive leveling filtering process is outside a boundary of a picture, or outside a patch boundary and a value of a cross patch boundary filter flag is '0', if the sample is a first sample point in an upper left corner, a lower left corner, an upper right corner or a lower right corner outside of the adaptive leveling filter unit, using a sample nearest to the sample in the adaptive leveling filter unit to replace the sample for filtering;
     in the case where the sample used in the adaptive leveling filtering process is not outside a boundary of the picture, conditions that the sample is outside a patch boundary and the value of the cross patch boundary filter flag is '0' are not satisfied, and the sample is outside an upper boundary or outside a lower boundary of the adaptive leveling filter unit, if the sample is a first sample point in an upper left corner, a lower left corner, an upper right corner or a lower right corner outside of the adaptive leveling filter unit, using a sample nearest to the sample in the adaptive leveling filter unit to replace the sample for filtering;
     in the case where the sample used in the adaptive leveling filtering process is not outside a boundary of the picture, conditions that the sample is outside a patch boundary and the value of the cross patch boundary filter flag is '0' are not satisfied, and the sample is not outside an upper boundary of the adaptive leveling filter unit or outside a lower boundary of the adaptive leveling filter unit, using the sample for filtering.

2. The filtering method according to claim 1, wherein the Wiener filter comprises 15 filter coefficients.

3. The filtering method according to claim 1, wherein before it is determined to enable the Wiener filtering for the adaptive leveling filter unit of the current picture, the filtering method further comprises:
   determining whether to filter the current picture;
   in response to determining to filter the current picture,
     determining whether to enable the Wiener filtering for the adaptive leveling filter unit, and
     in response to determining to enable the Wiener filtering for the adaptive leveling filter unit,
       deriving the adaptive leveling filter unit from the LCU of the current picture;
       obtaining the reference pixels of the adaptive leveling filter unit and the filter coefficients of the Wiener filter; and
       according to the reference pixels and the filter coefficients of the Wiener filter, performing the Wiener filtering based on the sample pixels of the adaptive leveling filter unit.

4. The filtering method according to claim 1, wherein before it is determined to enable the Wiener filtering for the adaptive leveling filter unit of the current picture, the filtering method further comprises:
   performing region division on the current picture according to a position of the LCU in the current picture, LCUs belonging to one region being configured with same filtering parameters, and the filtering parameters comprising the filter coefficients of the Wiener filter for the Wiener filtering.

5. The filtering method according to claim 4, wherein performing region division on the current picture according to the position of the LCU in the current picture comprising:
   dividing the current picture into a plurality of regions, a number of the regions being greater than or equal to 16.

6. A decoding device, comprising a processor, and a machine-readable storage medium storing machine executable instructions that can be executed by the processor, wherein when executing the machine executable instructions, the processor is caused to:
   when it is determined to enable Wiener filtering for an adaptive leveling filter unit of a current picture,
     derive the adaptive leveling filter unit from a current Largest Coding Unit (LCU) of the current picture;
     obtain reference pixels of the adaptive leveling filter unit and filter coefficients of a Wiener filter; and
     according to the reference pixels and the filter coefficients of the Wiener filter, perform the Wiener filtering based on sample pixels of the adaptive leveling filter unit;

wherein the Wiener filter is a centrosymmetric filter with a shape of a 7*7 cross plus a 5*5 square, and values of the reference pixels are derived from pixel values of a reconstructed picture before the Wiener filtering;

wherein in according to the reference pixels and the filter coefficients of the Wiener filter, performing the Wiener filtering based on the sample pixels of the adaptive leveling filter unit, the processor is caused to:

if a sample used in an adaptive leveling filtering process is a sample in the adaptive leveling filter unit, using the sample used in the adaptive leveling filtering process for filtering;

if a sample used in the adaptive leveling filtering process is not a sample in the adaptive leveling filter unit, in the case where the sample used in the adaptive leveling filtering process is outside a boundary of a picture, or outside a patch boundary and a value of a cross patch boundary filter flag is '0', if the sample is a first sample point in an upper left corner, a lower left corner, an upper right corner or a lower right corner outside of the adaptive leveling filter unit, using a sample nearest to the sample in the adaptive leveling filter unit to replace the sample for filtering;

in the case where the sample used in the adaptive leveling filtering process is not outside a boundary of the picture, conditions that the sample is outside a patch boundary and the value of the cross patch boundary filter flag is '0' are not satisfied, and the sample is outside an upper boundary or outside a lower boundary of the adaptive leveling filter unit, if the sample is a first sample point in an upper left corner, a lower left corner, an upper right corner or a lower right corner outside of the adaptive leveling filter unit, using a sample nearest to the sample in the adaptive leveling filter unit to replace the sample for filtering;

in the case where the sample used in the adaptive leveling filtering process is not outside a boundary of the picture, conditions that the sample is outside a patch boundary and the value of the cross patch boundary filter flag is '0' are not satisfied, and the sample is not outside an upper boundary of the adaptive leveling filter unit or outside a lower boundary of the adaptive leveling filter unit, using the sample for filtering.

7. The decoding device according to claim 6, wherein the Wiener filter comprises 15 filter coefficients.

8. The decoding device according to claim 6, wherein before it is determined to enable the Wiener filtering for the adaptive leveling filter unit of the current picture, the processor is further caused to:

determine whether to filter the current picture;

in response to determining to filter the current picture, determine whether to enable the Wiener filtering for the adaptive leveling filter unit, and in response to determining to enable the Wiener filtering for the adaptive leveling filter unit, derive the adaptive leveling filter unit from the LCU of the current picture;

obtain the reference pixels of the adaptive leveling filter unit and the filter coefficients of the Wiener filter; and according to the reference pixels and the filter coefficients of the Wiener filter, perform the Wiener filtering based on the sample pixels of the adaptive leveling filter unit.

9. The decoding device according to claim 6, wherein before it is determined to enable the Wiener filtering for the adaptive leveling filter unit of the current picture, the processor is further caused to:

perform region division on the current picture according to a position of the LCU in the current picture, LCUs belonging to one region being configured with same filtering parameters, and the filtering parameters comprising the filter coefficients of the Wiener filter for the Wiener filtering.

10. The decoding device according to claim 9, wherein in performing region division on the current picture according to the position of the LCU in the current picture, the processor is caused to:

divide the current picture into a plurality of regions, a number of the regions being greater than or equal to 16.

11. An encoding device, comprising a processor, and a machine-readable storage medium storing machine executable instructions that can be executed by the processor, wherein when executing the machine executable instructions, the processor is caused to:

when it is determined to enable Wiener filtering for an adaptive leveling filter unit of a current picture, derive the adaptive leveling filter unit from a current Largest Coding Unit (LCU) of the current picture;

obtain reference pixels of the adaptive leveling filter unit and filter coefficients of a Wiener filter; and according to the reference pixels and the filter coefficients of the Wiener filter, perform the Wiener filtering based on sample pixels of the adaptive leveling filter unit;

wherein the Wiener filter is a centrosymmetric filter with a shape of a 7*7 cross plus a 5*5 square, and values of the reference pixels are derived from pixel values of a reconstructed picture before the Wiener filtering;

wherein in according to the reference pixels and the filter coefficients of the Wiener filter, performing the Wiener filtering based on the sample pixels of the adaptive leveling filter unit, the processor is caused to:

if a sample used in an adaptive leveling filtering process is a sample in the adaptive leveling filter unit, using the sample used in the adaptive leveling filtering process for filtering;

if a sample used in the adaptive leveling filtering process is not a sample in the adaptive leveling filter unit, in the case where the sample used in the adaptive leveling filtering process is outside a boundary of a picture, or outside a patch boundary and a value of a cross patch boundary filter flag is '0', if the sample is a first sample point in an upper left corner, a lower left corner, an upper right corner or a lower right corner outside of the adaptive leveling filter unit, using a sample nearest to the sample in the adaptive leveling filter unit to replace the sample for filtering;

in the case where the sample used in the adaptive leveling filtering process is not outside a boundary of the picture, conditions that the sample is outside a patch boundary and the value of the cross patch boundary filter flag is '0' are not satisfied, and the sample is outside an upper boundary or outside a lower boundary of the adaptive leveling filter unit, if the sample is a first sample point in an upper left corner, a lower left corner, an upper right corner or a lower right corner outside of the adaptive leveling filter unit, using a sample nearest to the sample in the adaptive leveling filter unit to replace the sample for filtering;

in the case where the sample used in the adaptive leveling filtering process is not outside a boundary of the picture, conditions that the sample is outside a patch boundary and the value of the cross patch boundary filter flag is '0' are not satisfied, and the sample is not outside an upper boundary of the adaptive leveling filter unit or outside a lower boundary of the adaptive leveling filter unit, using the sample for filtering.

12. The encoding device according to claim 11, wherein the Wiener filter comprises 15 filter coefficients.

13. The encoding device according to claim 11, wherein before it is determined to enable the Wiener filtering for the adaptive leveling filter unit of the current picture, the processor is further caused to:
  determine whether to filter the current picture;
  in response to determining to filter the current picture,
    determine whether to enable the Wiener filtering for the adaptive leveling filter unit, and
    in response to determining to enable the Wiener filtering for the adaptive leveling filter unit,
      derive the adaptive leveling filter unit from the LCU of the current picture;
      obtain the reference pixels of the adaptive leveling filter unit and the filter coefficients of the Wiener filter; and
      according to the reference pixels and the filter coefficients of the Wiener filter, perform the Wiener filtering based on the sample pixels of the adaptive leveling filter unit.

14. The encoding device according to claim 11, wherein before it is determined to enable the Wiener filtering for the adaptive leveling filter unit of the current picture, the processor is further caused to:
  perform region division on the current picture according to a position of the LCU in the current picture, LCUs belonging to one region being configured with same filtering parameters, and the filtering parameters comprising the filter coefficients of the Wiener filter for the Wiener filtering.

15. The encoding device according to claim 14, wherein in performing region division on the current picture according to the position of the LCU in the current picture, the processor is caused to:
  divide the current picture into a plurality of regions, a number of the regions being greater than or equal to 16.

16. A non-transitory machine-readable storage medium having stored thereon machine-readable instructions that, when executed by a processor, cause the processor to perform the filtering method according to claim 1, wherein the filtering method comprises:
  determining to enable Wiener filtering for an adaptive leveling filter unit of a current picture,
  deriving the adaptive leveling filter unit from a current Largest Coding Unit (LCU) of the current picture;
  obtaining reference pixels of the adaptive leveling filter unit and filter coefficients of a Wiener filter; and
  according to the reference pixels and the filter coefficients of the Wiener filter, performing the Wiener filtering based on sample pixels of the adaptive leveling filter unit;
wherein the Wiener filter is a centrosymmetric filter with a shape of a 7*7 cross plus a 5*5 square, and values of the reference pixels are derived from pixel values of a reconstructed picture before the Wiener filtering;
wherein according to the reference pixels and the filter coefficients of the Wiener filter, performing the Wiener filtering based on the sample pixels of the adaptive leveling filter unit, comprises:
  if a sample used in an adaptive leveling filtering process is a sample in the adaptive leveling filter unit, using the sample used in the adaptive leveling filtering process for filtering;
  if a sample used in the adaptive leveling filtering process is not a sample in the adaptive leveling filter unit,
    in the case where the sample used in the adaptive leveling filtering process is outside a boundary of a picture, or outside a patch boundary and a value of a cross patch boundary filter flag is '0', if the sample is a first sample point in an upper left corner, a lower left corner, an upper right corner or a lower right corner outside of the adaptive leveling filter unit, using a sample nearest to the sample in the adaptive leveling filter unit to replace the sample for filtering;
    in the case where the sample used in the adaptive leveling filtering process is not outside a boundary of the picture, conditions that the sample is outside a patch boundary and the value of the cross patch boundary filter flag is '0' are not satisfied, and the sample is outside an upper boundary or outside a lower boundary of the adaptive leveling filter unit, if the sample is a first sample point in an upper left corner, a lower left corner, an upper right corner or a lower right corner outside of the adaptive leveling filter unit, using a sample nearest to the sample in the adaptive leveling filter unit to replace the sample for filtering;
    in the case where the sample used in the adaptive leveling filtering process is not outside a boundary of the picture, conditions that the sample is outside a patch boundary and the value of the cross patch boundary filter flag is '0' are not satisfied, and the sample is not outside an upper boundary of the adaptive leveling filter unit or outside a lower boundary of the adaptive leveling filter unit, using the sample for filtering.

* * * * *